(12) United States Patent                              (10) Patent No.:     US 8,614,025 B2
Takeguchi et al.                                         (45) Date of Patent:        Dec. 24, 2013

(54) FUEL CELL SEPARATOR AND FUEL CELL COMPRISING THE SAME

(75) Inventors: Shinsuke Takeguchi, Osaka (JP); Yoichiro Tsuji, Osaka (JP); Takashi Nakagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 986 days.

(21) Appl. No.: 12/593,173

(22) PCT Filed: Dec. 24, 2008

(86) PCT No.: PCT/JP2008/003915
§ 371 (c)(1),
(2), (4) Date: Sep. 25, 2009

(87) PCT Pub. No.: WO2009/084183
PCT Pub. Date: Jul. 9, 2009

(65) Prior Publication Data
US 2010/0104923 A1    Apr. 29, 2010

(30) Foreign Application Priority Data

Dec. 28, 2007 (JP) .................................. 2007-340562
May 19, 2008 (JP) .................................. 2008-131164

(51) Int. Cl.
  *H01M 8/24*     (2006.01)
  *H01M 2/38*     (2006.01)
  *H01M 2/40*     (2006.01)
(52) U.S. Cl.
  USPC ........................................ 429/457; 429/456
(58) Field of Classification Search
  USPC .................. 429/428, 443–444, 446, 452, 545, 429/456–458, 465, 479–483, 490–492, 429/507–509, 512–515, 535
  See application file for complete search history.

(56) References Cited

U.S. PATENT DOCUMENTS 5,998,055 A *  12/1999  Kurita et al. ................... 429/480
7,067,213 B2 *   6/2006  Boff et al. ...................... 429/457
(Continued)

FOREIGN PATENT DOCUMENTS

EP       1919016 A1      5/2008
JP       08-045520       2/1996
(Continued)

OTHER PUBLICATIONS

Machine Translation and Abstract in English of WO 2007/088832.*

(Continued)

*Primary Examiner* — Barbara Gilliam
*Assistant Examiner* — Claire L Roe
(74) *Attorney, Agent, or Firm* — McDermott Will & Emery LLP

(57) ABSTRACT

The invention provides a fuel cell separator wherein a first reaction gas channel 131 has a first portion 41 and a second portion 51 located upstream of the first portion 41, the first portion 41 lying closest to the upstream end of the first reaction gas channel 131 among portions located between the second portion 51 and the downstream end of the first reaction gas channel 131, the second portion 51 lying closest to the downstream end among portions located between the upstream end and the first portion 41 of the first reaction gas channel 131. Second reaction gas channels 132, 133 do not exist between the first portion 41 and the upstream end but exist between the second portion 51 and the downstream end. The first reaction gas channel 131 is communicated with at least one (hereinafter referred to as the "specific channel") of the second reaction gas channels 132, 133 in a portion (hereinafter referred to as the "specific portion") between the first portion 41 and the downstream end.

7 Claims, 22 Drawing Sheets

(56) References Cited

U.S. PATENT DOCUMENTS

| | | |
|---|---|---|
| 2001/0005557 A1 | 6/2001 | Yosida et al. |
| 2005/0118485 A1* | 6/2005 | Tawfik et al. .................. 429/37 |
| 2009/0029228 A1* | 1/2009 | Shibata et al. ................. 429/34 |
| 2009/0162727 A1 | 6/2009 | Kusakabe et al. |

FOREIGN PATENT DOCUMENTS

| | | |
|---|---|---|
| JP | 09-283162 | 10/1997 |
| JP | 10-106594 | 4/1998 |
| JP | 10-284094 | 10/1998 |
| JP | 11-016591 | 1/1999 |
| JP | 2001-185172 | 7/2001 |
| JP | 2005-190714 | 7/2005 |
| JP | 2006-236851 | 9/2006 |
| JP | 2006-351222 | 12/2006 |
| WO | 2007018156 A1 | 2/2007 |
| WO | WO 2007088832 A1 * | 8/2007 ............. H01M 8/02 |

OTHER PUBLICATIONS

European Extended Search Report issued in a corresponding European application, dated Aug. 5, 2013.

* cited by examiner

FUEL CELL SEPARATOR AND FUEL CELL COMPRISING THE SAME

RELATED APPLICATIONS

This application is the U.S. National Phase under 35 U.S.C. §371 of International Application No. PCT/JP 2008/003915, filed on Dec. 24, 2008, which in turn claims the benefit of Japanese Application No. 2007-340562, filed on Dec. 28, 2007 and Japanese Application No. 2008-131164, filed on May 19, 2008, the disclosures of which Applications are incorporated by reference herein.

TECHNICAL FIELD

The present invention relates to a fuel cell separator and a fuel cell comprising the same, and more particularly to a structure of the fuel cell separator.

BACKGROUND ART

Polymer electrolyte fuel cells (hereinafter referred to as "PEFCs") generate electric power and heat at the same time by the electrochemical reaction between a hydrogen-containing fuel gas and an oxygen-containing oxidizing gas such as air. Each cell provided in a PEFC has an MEA (Membrane-Electrode-Assembly) composed of a polymer electrolyte membrane and a pair of gas diffusion electrodes (an anode and a cathode); gaskets; and plate-shaped electrically-conductive separators. PEFCs are generally formed by stacking a plurality of such cells, sandwiching the stack of cells at the ends with end plates, and fastening the end plates to the cells with a fastening device.

The principal surfaces of each separator are provided with manifold holes (a reaction gas supply manifold hole and a reaction gas discharge manifold hole) that define a manifold for supplying the fuel gas or the oxidizing gas or a manifold for discharging the fuel gas or the oxidizing gas (these gases are referred to as "reaction gases"), respectively. The principal surface of each separator in contact with either of the gas diffusion electrodes is provided with groove-shaped reaction gas channels which allow its associated reaction gas to flow therein and which are communicated with these manifold holes.

While flowing through their associated reaction gas channels, the reaction gases are supplied to the MEA and consumed by the electrochemical reaction occurring within the MEA. Therefore, hydrogen concentration and oxygen concentration decreases in the downstream portions of the reaction gas channels, due to the consumption of the reaction gases. This causes a problem that, in the downstream portions of the reaction gas channels where gas concentration is low, the amount of generated power decreases so that a power generation distribution corresponding to the gas concentration arises within in each cell surface.

As an attempt to solve this problem, there has been known a fuel cell according to which improved power generation efficiency is achieved by designing the shape of the gas channels so as to ensure uniform gas concentration in the cell surfaces (see e.g., Patent Document 1). FIG. 22 is a schematic view showing a schematic configuration of a principal surface of a separator provided in a fuel cell disclosed in Patent Document 1.

As illustrated in FIG. 22, the separator 200 provided in the fuel cell disclosed in Patent Document 1 has a plurality of fluid channels (reaction gas channels) 201 to 203 (three fluid channels in FIG. 22). Each fluid channel is composed of a substantially L-shaped upstream portion that is communicated, at its upstream end, with an inlet (reaction gas supply manifold hole) 211; a downstream portion that is communicated, at its downstream end, with an outlet (reaction gas discharge manifold hole) 212; and a midstream portion that connects the downstream end of the upstream portion to the upstream end of the downstream portion. The fluid channels are formed in a spiral shape when viewed as a whole. Accordingly, neither the upstream portions nor the downstream portions of the fluid channels are concentrated in a particular portion of the separator 200 so that uniform reaction gas concentration can be ensured in the electrode surface.

Patent Document 1: Japanese Laid-Open Patent Application Publication No. 10-284094

DISCLOSURE OF THE INVENTION

Problem to be Solved by the Invention

The inventors of the present application have found that there is still room for improvement in the separator 200 disclosed in Patent Document 1 in the light of improvements in the utilization efficiency of the reaction gases that flow in the plurality of fluid channels.

The invention has been made in consideration of the above problem and an object of the invention is therefore to provide a fuel cell separator and a fuel cell which enable an improvement in the utilization efficiency of the reaction gases that flow in the reaction gas channels.

Means for Solving the Problem

Through a series of research efforts dedicated to overcoming the problem presented by the above-discussed prior art, the inventors of the present application have found the following point.

Specifically, in each of the fluid channels 201 to 203 provided in the separator 200 of the fuel cell of the aforesaid Patent Document 1, the reaction gas flowing in the vicinity of the upstream end of the upstream portion partially shortcuts into the vicinity of the upstream end of the downstream portion, which vicinity is close to the upstream portion. This causes a part of the reaction gas flowing in the fluid channels 201 to 203 to be discharged without contributing to the reaction, which results in a decrease in the utilization efficiency of the reaction gas.

More concretely, since the fluid channels 201 to 203 are arranged adjacent to the gas diffusion layer of the gas diffusion electrode (such that the open surface (upper surface) of the separator 200 is covered by the gas diffusion layer), a part of the reaction gas flowing in the fluid channels 201 to 203 flows in the gas diffusion layer (hereinafter, the gas flowing in the gas diffusion layer is referred to as "underflow gas"). Therefore, in the lowermost fluid channel 201 among the three fluid channels 201 to 203, the reaction gas flowing in the upstream portion largely differs in pressure from the reaction gas flowing in a portion 204 of the downstream portion, the portion 204 lying closest to the upstream end of the fluid channel 201. In addition, owing to the short distance between the portion 204 of the downstream portion and the upstream portion of the fluid channel 201 (i.e., owing to the significant pressure difference gradient), the reaction gas flowing in the upstream portion of the fluid channel 201 partially flows into (partially shortcuts) the downstream portion of the fluid channel 201 by way of the gas diffusion layer. The reaction gas, which has flown into the downstream portion of the fluid channel 201, keeps going in the downstream portion and is then discharged through the outlet 212. Therefore, a part of the reaction gas flowing in the fluid channel 201 is discharged without contributing to the reaction and, in consequence, the utilization efficiency of the reaction gas decreases.

In addition, since the reaction gas flowing in the upstream portion of the lowermost fluid channel 201 among the three fluid channels 201 to 203 shortcuts, there arises a pressure difference between the reaction gas flowing in the upstream portions of the remaining two fluid channels 202, 203 and the reaction gas flowing in the upstream portion of the fluid channel 201. Owing to the pressure difference, the reaction gas flowing in the upstream portions of the remaining two fluid channels 202, 203 partially flows into the upstream portion of the fluid channel 201. Further, the reaction gas, which has flown into the upstream portion of the fluid channel 201, shortcuts into the downstream portion of the fluid channel 201. Therefore, the amount of reaction gas, which is discharged without contributing to the reaction of the reaction gas flowing in the fluid channels 201 to 203, becomes larger, entailing a further drop in the utilization efficiency of the reaction gas.

In addition, the reaction gas flowing in a part 205 of the upstream portion of the fluid channel 203, which part 205 lies closest to the downstream end of the fluid channel 203, largely differs in pressure from the reaction gas flowing in the downstream portion of the fluid channel 203, and the distance between the part 205 and the downstream portion of the fluid channel 203 is short (i.e., the pressure difference gradient is significant). Therefore, the reaction gas flowing in the vicinity of the part 205 of the fluid channel 203 partially flows into (partially shortcuts) the downstream portion of the fluid channel 203 by way of the gas diffusion layer. The reaction gas, which has flown into the downstream portion of the fluid channel 203, keeps going in the downstream portion and is then discharged through the outlet 212. Therefore, a part of the reaction gas flowing in the fluid channel 203 is discharged without contributing to the reaction and, in consequence, the utilization efficiency of the reaction gas further decreases.

The inventors of the present application have conceived the idea of the invention from the discovery that implementation of the configuration described herein below with a view to overcoming the above problem is extremely effective for achievement of the object of the invention.

According to the invention, there is provided a plate-shaped fuel cell separator comprising: a reaction gas supply manifold hole which penetrates through the fuel cell separator in a thickness direction thereof; a reaction gas discharge manifold hole which penetrates through the fuel cell separator in a thickness direction thereof; a groove-shaped first reaction gas channel which is formed in at least one of principal surfaces of the fuel cell separator such that an upstream end thereof is connected to the reaction gas supply manifold hole, a downstream end thereof is connected to the reaction gas discharge manifold hole, and the first reaction gas channel is bent; and one or more groove-shaped second reaction gas channels which are formed in at least one of the principal surfaces such that at least upstream ends of thereof are connected to the reaction gas supply manifold hole and are bent while running along the first reaction gas channel; wherein the first reaction gas channel is formed such that the first reaction gas channel has a first portion and a second portion located upstream of the first portion, the first portion lying closest to the upstream end among portions located between the second portion and the downstream end of the first reaction gas channel, the second portion lying closest to the downstream end among portions located between the upstream end and the first portion of the first reaction gas channel, and the second reaction gas channels do not exist between the first portion and the upstream end but exist between the second portion and the downstream end, and wherein the first reaction gas channel is communicated with at least one reaction gas channel (hereinafter referred to as "specific channel") of the one or more second reaction gas channels in a portion (hereinafter referred to as "specific portion") between the first portion and the downstream end.

In this configuration, the shortcut of the reaction gas occurs between the upstream end and the first portion of the first reaction gas channel, and in such a case, the shortcut reaction gas flows in at least one of the second reaction gas channels and accordingly, the reaction gas is distributed into the reaction gas channels. This reduces variations in the concentration of the reaction gas flowing in the first and second reaction gas channels.

In the fuel cell separator of the invention, the specific channel may be connected, at its downstream end, to the reaction gas supply manifold hole.

In the fuel cell separator of the invention, the specific channel may be communicated with the first reaction gas channel, with its downstream end being connected to the first reaction gas channel in the specific portion.

In the fuel cell separator of the invention, the first reaction gas channel may be communicated with the specific channel such that the first reaction gas channel is connected to the specific channel by a groove-shaped communication channel.

In the fuel cell separator of the invention, a reaction gas mixing portion including a recess having a plurality of projections standing on a bottom surface thereof may be formed in the specific portion, and the first reaction gas channel and the specific channel may join together in the reaction gas mixing portion to cause the first reaction gas channel to be communicated with the specific channel.

In the fuel cell separator of the invention, the first reaction gas channel and the specific channel may branch at the reaction gas mixing portion and extend toward the reaction gas discharge manifold hole.

In the fuel cell separator of the invention, a portion of the first reaction gas channel which is located between the second portion and the first portion may have a spiral shape, and a portion of the one or more second reaction gas channels, which portion corresponds to the portion of the first reaction gas channel which is located between the second portion and the first portion, may have a spiral shape.

In the fuel cell separator of the invention, a portion of the first reaction gas channel which is located between the second portion and the first portion may have a serpentine shape, and a portion of the one or more second reaction gas channels, which portion corresponds to the portion of the first reaction gas channel which is located between the second portion and the first portion, may have a serpentine shape.

In the fuel cell separator of the invention, the reaction gas supply manifold hole and the reaction gas discharge manifold hole may be arranged so as to sandwich a central portion of the fuel cell separator and to be opposed to each other.

According to the invention, there is provided a fuel cell comprising: a pair of fuel cell separators including the fuel cell separator described above; and an electrolyte-layer/electrode assembly having an electrolyte layer and a pair of electrodes that sandwich the electrolyte layer, wherein the electrolyte-layer/electrode assembly is sandwiched between the pair of fuel cell separators.

In this configuration, the shortcut of the reaction gas occurs between the upstream end and the first portion of the first reaction gas channel, and in such a case, the shortcut reaction gas flows into at least one of the second reaction gas channels so that the reaction gas is distributed into the reaction gas channels. This reduces variations in the supply amount of the reaction gas flowing in the first and second reaction gas channels.

These objects as well as other objects, features and advantages of the invention will become apparent to those skilled in the art from the following detailed description of preferred embodiments with reference to the accompanying drawings.

Effects of the Invention

According to the fuel cell separator and fuel cell of the invention, variations in the supply amount of the reaction gases flowing in the reaction gas channels can be reduced to thereby achieve an improvement in the utilization efficiency of the reaction gases. Further, according to the fuel cell separator and fuel cell of the invention, the amount of reaction gas that shortcuts without flowing along the reaction gas channels is reduced to thereby reduce the amount of reaction gas to be discharged without contributing to the reaction of the reaction gases flowing in the reaction gas channels, so that the utilization efficiency of the reaction gases can be improved.

REFERENCE NUMERALS IN THE DRAWINGS

Figure 1:
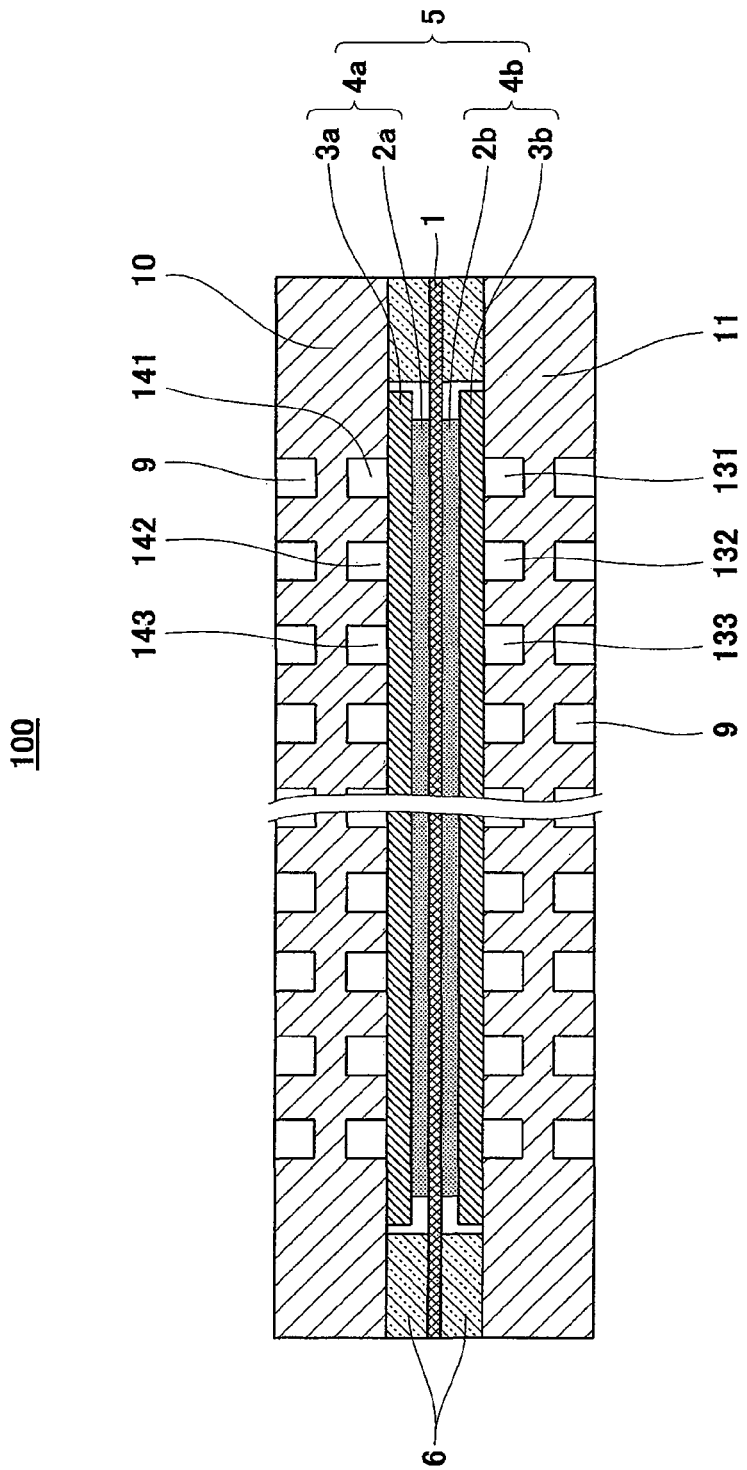
FIG. 1 is a cross-sectional view that schematically illustrates a schematic configuration of a fuel cell constructed according to a first embodiment of the invention.

1: polymer electrolyte membrane
2$a$: anode catalyst layer
2$b$: cathode catalyst layer
3$a$: anode gas diffusion layer
3$b$: cathode gas diffusion layer
4$a$: anode
4$b$: cathode
5: MEA (Membrane-Electrode-Assembly: electrolyte-layer/electrode assembly)
6: gasket
9: cooling medium channel
10: anode separator
11: cathode separator
21: oxidizing gas supply manifold hole (reaction gas supply manifold hole)
22: oxidizing gas discharge manifold hole (reaction gas discharge manifold hole)
23: fuel gas supply manifold hole (reaction gas supply manifold hole)
24: fuel gas discharge manifold hole (reaction gas discharge manifold hole)
25: cooling medium supply manifold hole
26: cooling medium discharge manifold hole
31$a$: first upstream linear portion
31$b$: first upstream turn portion
31$c$: second upstream linear portion
31$d$: second upstream turn portion
31$e$: third upstream linear portion
31$f$: third upstream turn portion
31$g$: first downstream turn portion
31$h$: first downstream linear portion
31$i$: second downstream turn portion
31$j$: second downstream linear portion
31$k$: third downstream turn portion
31$m$: third downstream turn portion
31$n$: fourth downstream turn portion
31$p$: fourth downstream linear portion
33$a$: first upstream linear portion
33$b$: first upstream turn portion
33$c$: second upstream linear portion 33d: second upstream turn portion
33e: third upstream linear portion
33f: third upstream turn portion
33g: first downstream turn portion
33h: first downstream linear portion
33i: second downstream turn portion
33j: second downstream linear portion
33k: third downstream turn portion
33m: third downstream turn portion
33n: fourth downstream turn portion
33p: fourth downstream linear portion
41: first portion
51: second portion
52: third portion
53: fourth portion
61: communication channel
62: recess
63: projection
64: first reaction gas mixing portion
65: second reaction gas mixing portion
100: fuel cell
101: central axis
131: oxidizing gas channel (first reaction gas channel, groove)
131a: upstream portion
131b: midstream portion
131c: downstream portion
132: second oxidizing gas channel (second reaction gas channel, groove)
133: second oxidizing gas channel (second reaction gas channel, groove), third oxidizing gas channel (third reaction gas channel)
134: second oxidizing gas channel (second reaction gas channel)
135: second oxidizing gas channel (second reaction gas channel)
141: first fuel gas channel (first reaction gas channel)
142: second fuel gas channel (second reaction gas channel)
143: second fuel gas channel (second reaction gas channel)
200: separator
201: fluid channel
202: fluid channel
203: fluid channel
211: inlet
212: outlet

BEST MODE FOR CARRYING OUT THE INVENTION

Referring now to the accompanying drawings, preferred embodiments of the invention will be described below. In all figures, the same or corresponding parts are indicated by the same numerals and repetition of explanation is avoided. The vertical direction of the separators is designated as the vertical direction that would appear to a person viewing FIGS. 2 to 21 and the first reaction gas channel is hatched for clarity.

(First Embodiment)
[Fuel Cell Configuration]

FIG. 1 is a cross-sectional view that schematically illustrates a schematic configuration of a fuel cell constructed according to a first embodiment of the invention. Note that FIG. 1 omits some parts.

As shown in FIG. 1, the fuel cell 100 of the first embodiment is a cell and includes an MEA (Membrane-Electrode-Assembly: electrolyte-layer/electrode assembly) 5, gaskets 6, an anode separator 10 and a cathode separator 11.

The MEA 5 has a polymer electrolyte membrane 1 (electrolyte layer: e.g., Nafion (trade name) produced by Dupont US), an anode 4a, and a cathode 4b.

The polymer electrolyte membrane 1 is substantially quadrangular in shape (rectangular in this embodiment). The anode 4a and the cathode 4b (that are referred to as "gas diffusion electrodes") are disposed on both surfaces, respectively, of the polymer electrolyte membrane 1 and positioned internally of the peripheral portions thereof. In the peripheral portion of the polymer electrolyte membrane 1, manifold holes such as the reaction gas supply manifolds described later are provided so as to penetrate through the polymer electrolyte membrane 1 in its thickness direction (not shown in the FIG. 1).

Specifically, the anode 4a is provided on either one of the principal surfaces of the polymer electrolyte membrane 1 and has an anode catalyst layer 2a and an anode gas diffusion layer 3a. The anode catalyst layer 2a is composed of a mixture of electrically conductive carbon particles carrying an electrode catalyst (e.g., precious metal such as platinum) and polymer electrolyte having hydrogen ion conductivity. The anode gas diffusion layer 3a is placed on a principal surface of the anode catalyst layer 2a and has both gas permeability and conductive property. Likewise, the cathode 4b is disposed on the other principal surface of the polymer electrolyte membrane 1 and has a cathode catalyst layer 2b and a cathode gas diffusion layer 3b. The cathode catalyst layer 2b is composed of a mixture of electrically conductive carbon particles carrying an electrode catalyst (e.g., precious metal such as platinum) and polymer electrolyte having hydrogen ion conductivity. The cathode gas diffusion layer 3b is placed on the principal surface of the cathode catalyst layer 2b and has both gas permeability and conductive property.

The anode catalyst layer 2a and the cathode catalyst layer 2b may be formed by a method known in the art, using a catalyst layer formation ink containing electrically conductive carbon particles carrying an electrode catalyst made of precious metal, polymer electrolyte, and a dispersion medium. The material of the anode gas diffusion layer 2a and the cathode gas diffusion layer 2b is not limited to any particular materials and these layers 2a, 2b may be made from materials known in the art. For instance, electrically conductive porous base materials such as carbon cloth and carbon paper may be used. Water repellent finishing may be applied to these electrically conductive porous base materials by a known method.

A pair of substantially rectangular ring shaped gaskets 6 made of fluoro-rubber are disposed around the anode 4a and cathode 4b, respectively, of the MEA 5 so as to sandwich the polymer electrolyte membrane 1. This prevents the fuel gas, air and the oxidizing gas from leaking to the outside of the cell and being mixed within the fuel cell 100. The peripheral portion of each gasket 6 is provided with manifold holes such as the reaction gas supply manifold holes described later which penetrate through the gasket 6 in its thickness direction.

A plate-shaped anode separator (fuel cell separator) 10 and a plate-shaped cathode separator (fuel cell separator) 11, which have conductive property, are disposed so as to sandwich the MEA 5 and the gaskets 6. This makes it possible to mechanically fix the MEA 5 and electrically connect the MEAs 5 when a plurality of fuel cells 100 is stacked in their thickness direction. These separators 10, 11 may be made from a metal having good thermal conductivity and electrical conductivity, graphite or a mixture of graphite and resin. For instance, they may be formed by injection molding of a mixture of carbon powder and a binder (solvent medium), or formed by plating the surface of a titanium plate or stainless steel plate with gold.

One of the principal surfaces of the anode separator 10, which is in contact with the anode 4a, is provided with a groove-shaped, first fuel gas channel (first reaction gas channel) 141 for allowing the fuel gas to flow therein, and groove-shaped, second fuel gas channels (second reaction gas channels) 142, 143 that run along the first fuel gas channel. The other principal surface is provided with a groove-shaped, cooling medium channel 9 for allowing the cooling medium to flow therein. Likewise, one of the principal surfaces of the cathode separator 11, which is in contact with the cathode 4b, is provided with a groove-shaped, first oxidizing gas channel (first reaction gas channel) 131 for allowing the oxidizing gas to flow therein, and second oxidizing gas channels (second reaction gas channels) 132, 133 that run along the first oxidizing gas channel 131. The other principal surface is provided with a groove-shaped, cooling medium channels 9 for allowing the cooling medium to flow therein.

The above configuration allows the anode 4a and the cathode 4b to be supplied with the fuel gas and the oxidizing gas respectively, so that these gases react with each other, thereby generating electric power and heat. In addition, the cooling medium such as cooling water is allowed to flow in the cooling medium channel 9 thereby recovering the generated heat.

The fuel cell 100 having the configuration described above may be used as a cell. Alternatively, a plurality of such fuel cells 100 may be stacked to be used as a cell stack. In cases where the fuel cells 100 are stacked, the cooling medium channel 9 may be provided for every two or three cells. In cases where no cooling medium channel 9 is provided between the cells, the separator sandwiched by two MEAs 5 may have the first fuel gas channel 141 and the second fuel gas channels 142, 143 at either one of the principal surfaces thereof and the first oxidizing gas channel 131 and the second oxidizing gas channels 132, 133 at the other principal surface in order to serve as both the anode separator 10 and the cathode separator 11.

Next, the cathode separator 11 will be described in detail with reference to FIGS. 1 and 2. It should be noted that the anode separator 10 has basically the same configuration as of the cathode separator 11 and therefore a detailed description thereof is omitted herein.

[Fuel Cell Separator Configuration]

Figure 2:
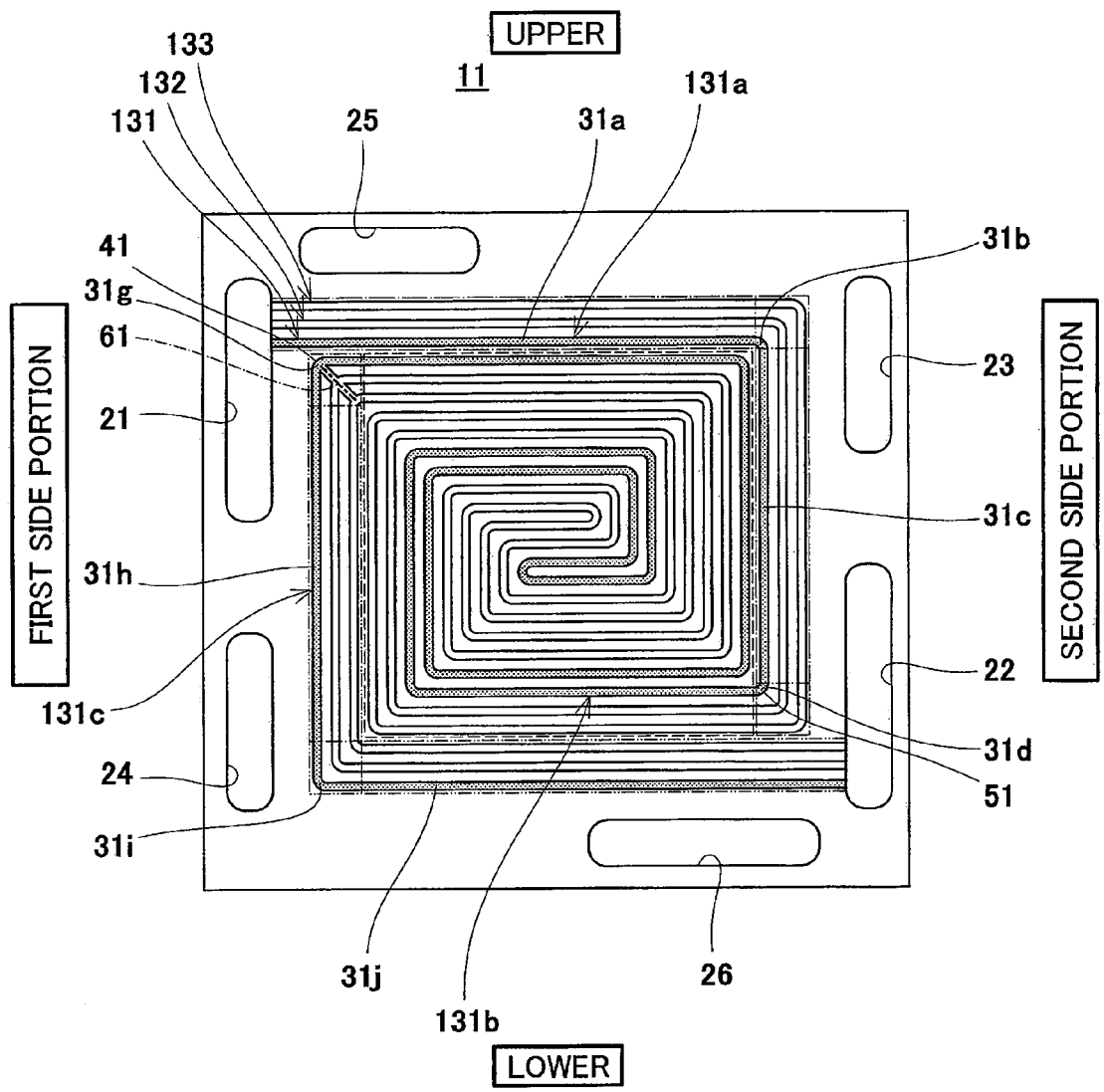
FIG. 2 is a schematic view showing a schematic configuration of a cathode separator of the fuel cell shown in FIG. 1.

FIG. 2 is a schematic view showing a schematic configuration of the cathode separator 11 (a fuel cell separator according to the first embodiment of the invention) of the fuel cell 100 shown in FIG. 1.

As shown in FIG. 2, the cathode separator 11 of the first embodiment is in the form of a substantially rectangular plate. The peripheral portion of the principal surface of the cathode separator 11 is provided with a plurality of through holes that penetrate through the cathode separator 11 in its thickness direction. These through holes constitute an oxidizing gas supply manifold hole (reaction gas supply manifold hole) 21 for supplying the oxidizing gas; an oxidizing gas discharge manifold hole (reaction gas discharge manifold hole) 22 for discharging the oxidizing gas; a fuel gas supply manifold hole (reaction gas supply manifold hole) 23 for supplying the fuel gas; a fuel gas discharge manifold hole (reaction gas discharge manifold hole) 24 for discharging the fuel gas; a cooling medium supply manifold hole 25 for supplying the cooling medium; and a cooling medium discharge manifold hole 26 for discharging the cooling medium, respectively.

The oxidizing gas supply manifold hole 21 is located at the upper part of one side portion (i.e., the left side portion in the drawing, which is hereinafter referred to "the first side portion") of the cathode separator 11, whereas the oxidizing gas discharge manifold hole 22 is located at the lower part of the other side portion (i.e., the right side portion in the drawing, which is hereinafter referred to "the second side portion") of the fuel cell separator. The fuel gas supply manifold hole 23 is located at the upper part of the second side portion whereas the fuel gas discharge manifold hole 24 is located at the lower part of the first side portion. The cooling medium supply manifold hole 25 is located above and on the second side portion side of the oxidizing gas supply manifold hole 21, whereas the cooling medium discharge manifold hole 26 is located under and on the first side portion side of the oxidizing gas discharge manifold hole 22.

The oxidizing gas supply manifold hole 21 and the oxidizing gas discharge manifold hole 22 are opposed to each other with the central portion of the cathode separator 11 being located therebetween, whereas the fuel gas supply manifold hole 23 and the fuel gas discharge manifold hole 24 are opposed to each other with the central portion of the cathode separator 11 being located therebetween. Herein, the central portion of the cathode separator 11 is defined as the center portion in relation to the outer periphery of the cathode separator 11.

On one of the principal surfaces of the cathode separator 11, the groove-shaped first oxidizing gas channel 131 and the plurality of groove-shaped second oxidizing gas channels 132, 133 (two second oxidizing gas channels in this embodiment) are provided, which are arranged so as to establish fluid-communication between the oxidizing gas supply manifold hole 21 and the oxidizing gas discharge manifold hole 22 so that the entire principal surface of the cathode 4b is supplied with the oxidizing gas. The first oxidizing gas channel 131 and the second oxidizing gas channels 132, 133 are so formed as to run along one another. The expression "the oxidizing gas channels run along" as stated herein means that the plurality of oxidizing gas channels are arranged along one another. The second oxidizing gas channels 132, 133 are similar in configuration to the first oxidizing gas channel 131 and therefore only the first oxidizing gas channel 131 will be explained in the following description.

The first oxidizing gas channel 131 is composed of a substantially L-shaped upstream portion 131a (the channel portion indicated by dashed-dotted line in FIG. 2) which communicates, at its upstream end, with the oxidizing gas supply manifold hole 21; a downstream portion 131c (the channel portion indicated by dashed-two dotted line in FIG. 2) which communicates, at its downstream end, with the oxidizing gas discharge manifold hole 22; and a midstream portion 131b (the channel portion indicated by broken line in FIG. 2) which is connected, at its upstream end, to the downstream end of the upstream portion 131a and connected, at its downstream end, to the upstream end of the downstream portion 131c. The midstream portion 131b is so formed as to be surrounded by the upstream portion 131a and the downstream portion 131c.

Herein, the upstream portion 131a is a portion of the first oxidizing gas channel 131 which is located between two ends one of which corresponds to the upstream end of the first oxidizing gas channel 131, that is, the connection end connected to the oxidizing gas supply manifold hole 21, whereas the other end satisfies Expression: L1=<L2 (L1 is equal to or less than L2). In the above expression, L1 designates the length of the upstream portion 131a of the first oxidizing gas channel 131 whereas L2 designates the entire length of the first oxidizing gas channel 131. More preferably, the other end of the upstream portion 131a satisfies Expression: L1=<{(⅓)×L2} (L1 is equal to or less than one third of L2).

The downstream portion 131c is a portion of the first oxidizing gas channel 131 which is located between two ends one of which corresponds to the downstream end of the first oxidizing gas channel 131, that is, the connection end connected to the oxidizing gas discharge manifold hole 22, whereas the other end satisfies Expression: L3=<L2 (L3 is equal to or less than L2). In the above expression, L3 designates the length of the downstream portion 131c of the first oxidizing gas channel 131. More preferably, the other end of the downstream portion 131c satisfies Expression: L3=<{(⅓)×L2} (L3 is equal to or less than one third of L2).

The upstream portion 131a is composed of a first upstream linear portion 31a; a first upstream turn portion 31b, a second upstream linear portion 31c and a second upstream turn portion 31d. The first upstream linear portion 31a is formed so as to extend from the first side portion to the second side portion of the cathode separator 11 (in a horizontal direction). The first upstream turn portion 31b is connected, at its upstream end, to the downstream end of the first upstream linear portion 31a and is bent to change the flow of the channel from the horizontal direction to a vertical direction of the cathode separator 11. The second upstream linear portion 31c is connected to the downstream end of the first upstream turn portion 31b and formed so as to extend from the upper portion to the lower portion of the cathode separator 11 (in a vertical direction). The second upstream turn portion 31d is connected, at its upstream end, to the downstream end of the second upstream linear portion 31c and is bent to change the flow of channel from the vertical direction to the horizontal direction.

The midstream portion 131b is formed in a spiral shape. Concretely, the midstream portion 131b is formed so as to extend clockwise from the peripheral portion of the cathode separator 11 to its central portion in a convergent fashion and then turn back at the central portion of the cathode separator 11 to extend counterclockwise toward the peripheral portion of the cathode separator 11 in a divergent fashion. More specifically, the midstream portion 131b horizontally extends a certain distance in a direction from the second side portion to the first side portion (this direction is hereinafter referred to as the "first lateral direction"), starting from the downstream end of the second upstream turn portion 31d of the upstream portion 131a and then vertically extends a certain distance in a direction from the lower portion to the upper portion of the cathode separator 11 (this direction is hereinafter referred to as the "upward direction"). Thereafter, it horizontally extends a certain distance in a direction from the first side portion to the second side portion (this direction is hereinafter referred to as the "second lateral direction") and then vertically extends a certain distance from the upper portion to the lower portion of the cathode separator 11 (this direction is hereinafter referred to as the "downward direction"). After that, the midstream portion 131b reaches the central portion of the cathode separator 11. The midstream portion 131b then turns back at the central portion of the cathode separator 11 to horizontally extend a certain distance in the second lateral direction. Thereafter, the midstream portion 131b vertically extends a certain distance in the upward direction of the cathode separator 11 and then horizontally extends a certain distance in the first lateral direction. Then, it vertically extends a certain distance in the downward direction, horizontally extends a certain distance in the second lateral direction, and vertically extends a certain distance in the upward direction. After that, the midstream portion 131b reaches the upstream end of the downstream portion 131c.

The downstream portion 131c is composed of a first downstream turn portion 31g; a first downstream linear portion 31h, a second downstream turn portion 31i and a second downstream linear portion 31j. The first downstream turn portion 31g is connected, at its upstream end, to the downstream end of the midstream portion 131b and is bent to change the flow of channel from the horizontal direction to the vertical direction. The first downstream linear portion 31h is connected to the downstream end of the first downstream turn portion 31g and extends vertically in the downward direction. The second downstream turn portion 31i is connected to the downstream end of the first downstream linear portion 31h and is bent to change the flow of channel from the vertical direction to the horizontal direction. The second downstream linear portion 31j is connected to the downstream end of the second downstream turn portion 31i and horizontally extends in the second lateral direction with its downstream end being communicated with the oxidizing gas discharge manifold hole 22.

The first oxidizing gas channel 131 is thus constituted by the linear portions extending in the vertical or horizontal direction and the turn portions bent to change the flow of channel from the vertical direction to the horizontal direction or vice versa, such that the first oxidizing gas channel 131 is bent when viewed as a whole. The second oxidizing gas channels 132, 133 are arranged to run along the first oxidizing gas channel 131. The second oxidizing gas channels 132, 153 do not exist between a first portion 41 (described later) of the first oxidizing gas channel 131 and the upstream end of the first oxidizing gas channel 131, but exist between a second portion 51 (described later) of the first oxidizing gas channel 131 and the downstream end of the first oxidizing gas channel 131.

In the first oxidizing gas channel 131, the downstream portion 131c has the first portion 41 and the upstream portion 131a has the second portion 51. The first portion 41 lies closest to the upstream end of the first oxidizing gas channel 131 among portions located between the second portion 51 and the downstream end of the first oxidizing gas channel 131. In other words, the first portion 41 is the portion having the greatest pressure gradient relative to the upstream portion 131a in the downstream portion 131c of the first oxidizing gas channel 131 (i.e., the portion to which the greatest amount of reaction gas shortcuts from the upstream portion 131a). Concretely, in the first embodiment, the portion, which lies closest to the upstream end of the first oxidizing gas channel 131 among portions in the first downstream turn portion 31g of the downstream portion 131c, constitutes the first portion 41. Note that the portion between the first portion 41 and the downstream end of the first oxidizing gas channel 131 constitutes the "specific portion" of the invention.

In the first portion 41 of the first oxidizing gas channel 131, a groove-shaped communication channel 61 is provided for making the first oxidizing gas channel 131 and the second oxidizing gas channels 132, 133 communicate with one another. The communication channel 61 is formed so as to establish fluid communication between the first portion 41 of the first oxidizing gas channel 131, the downstream portion (more precisely, the first downstream turn portion of the downstream portion) of the second oxidizing gas channel 132 and the downstream portion (more precisely, the downstream portion of the downstream portion) of the second oxidizing gas channel 133. With this configuration, even if the oxidizing gas flowing in the upstream portions of the first oxidizing gas channel 131 and the second oxidizing gas channels 132, 133 partially shortcuts into the first portion 41 of the first oxidizing gas channel 131, the shortcut oxidizing gas is distributed to the second oxidizing gas channels 132, 133 by way of the communication channel 61. In this embodiment, the second oxidizing gas channels 132, 133 respectively constitute the "specific channel" of the invention.

The second portion lies closest to the downstream end of the first oxidizing gas channel 131 among portions between the upstream end of the first oxidizing gas channel 131 and the first portion 41. In other words, the second portion 51 is farthest from the upstream end of the first oxidizing gas channel 131 among portions between the upstream end and the first portion 41 of the first oxidizing gas channel 131, when viewed in the direction from the upstream end to the downstream end of the first oxidizing gas channel 131.

[Operational Effect of Fuel Cell]

Reference is made to FIGS. 1 and 2 to describe the operational effect of the fuel cell 100 of the first embodiment.

As discussed earlier, the pressure difference between the oxidizing gas flowing in the upstream portion 131a of the first oxidizing gas channel 131 and the oxidizing gas flowing in the downstream portion 131c of the first oxidizing gas channel 131 causes a part of the oxidizing gas flowing in the upstream portion 131a to flow into the first portion 41 of the first oxidizing gas channel 131 by way of the cathode gas diffusion layer 3b. When the pressure gradient between the oxidizing gas flowing in the upstream portion 131a of the first oxidizing gas channel 131 and the oxidizing gas flowing in the downstream portion 131c of the first oxidizing gas channel 131 is significant, the shortcut of the oxidizing gas is likely to occur.

If the oxidizing gas flowing in the upstream portion 131a of the first oxidizing gas channel 131 shortcuts into the first portion 41 of the first oxidizing gas channel 131, a pressure difference is generated between the oxidizing gas flowing in the upstream portions of the second oxidizing gas channels 132, 133 and the oxidizing gas flowing in the upstream portion 131a of the first oxidizing gas channel 131. This pressure difference causes a part of the oxidizing gas flowing in the upstream portions of the second oxidizing gas channels 132, 133 to flow into the upstream portion 131a of the first oxidizing gas channel 131. Then, a part of the oxidizing gas, which has flown from the second oxidizing gas channels 132, 133 into the first oxidizing gas channel 131, flows into the first portion 41, and as a whole, the oxidizing gas flowing in the first oxidizing gas channel 131 and the second oxidizing gas channels 132, 133 partially flows into the first portion 41. In this way, the supply amount of the oxidizing gas flowing in the first oxidizing gas channel 131 and the second oxidizing gas channels 132, 133 varies, which results in a drop in the utilization efficiency of the reaction gas.

In the fuel cell 100 of the first embodiment, the communication channel 61 is provided in the first portion 41 and therefore the shortcut oxidizing gas flows in the communication channel 61. This allows the shortcut oxidizing gas to be substantially uniformly distributed into the first oxidizing gas channel 131 and the second oxidizing gas channels 132, 133. Therefore, variations in the supply amount of the oxidizing gas flowing in the first oxidizing gas channel 131 and the second oxidizing gas channels 132, 133 can be reduced.

In addition, since the oxidizing gas which shortcuts into the downstream portions of the second oxidizing gas channels 132, 133 is distributed, the supply amount of the oxidizing gas flowing in the downstream portions of the second oxidizing gas channels 132, 133 increases, compared to the case where no communication channel 61 is provided. Therefore, not only the portion of the cathode 4b opposed to the downstream portion 131c of the first oxidizing gas channel 131 but also the portion of the cathode 4b opposed to the downstream portions of the second oxidizing gas channels 132, 133 contributes as the portion for the reaction between the reaction gases. This leads to an improvement in the utilization efficiency of the oxidizing gas.

In the fuel cell 100 of the first embodiment, variations in the supply amount of the reaction gas flowing in the reaction gas channels can be thus reduced thereby achieving an improvement in the utilization efficiency of the reaction gas.

(Second Embodiment)

Figure 3:
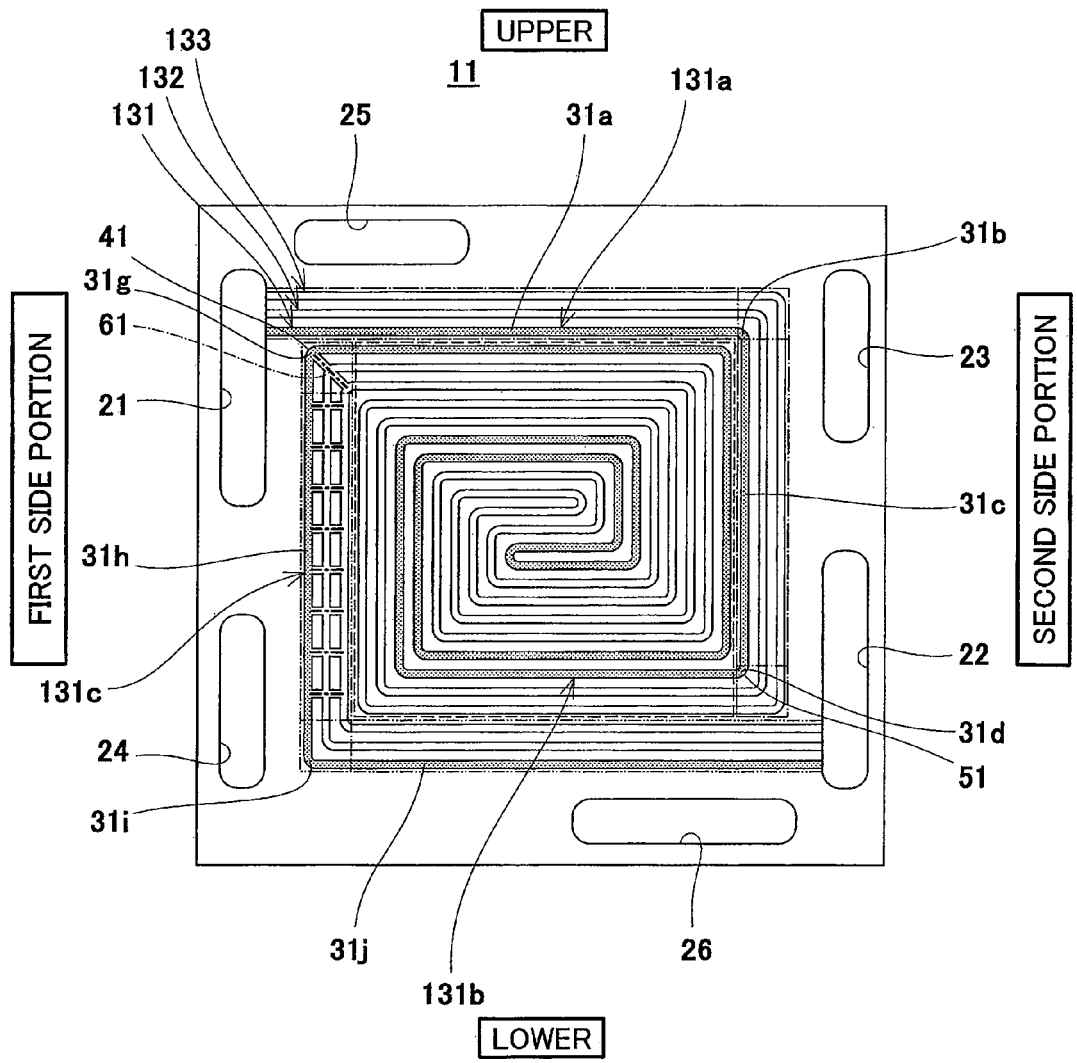
FIG. 3 is a schematic view showing a schematic configuration of a fuel cell separator according to a second embodiment of the invention.

FIG. 3 is a schematic view showing a schematic configuration of a fuel cell separator according to a second embodiment of the invention.

As shown in FIG. 3, the fuel cell separator (cathode separator) 11 of the second embodiment is the same in basic configuration as the fuel cell separator (cathode separator) 11 of the first embodiment except that, in the second embodiment, a plurality of communication channels 61 are arranged at specified intervals in a part of the specific portion of the first oxidizing gas channel 131 which part extends between the first portion 41 and the downstream end of the first downstream linear portion 31h of the downstream portion 131c, such that the first oxidizing gas channel 131 and the second oxidizing gas channels 132, 133 are communicated with one another.

In the fuel cell 100 having the fuel cell separator 11 thus configured according to the second embodiment, variations in the supply amount of the reaction gas flowing in the reaction gas channels can be reduced thereby achieving a further improvement in the utilization efficiency of the reaction gas.

(Third Embodiment)

Figure 4:
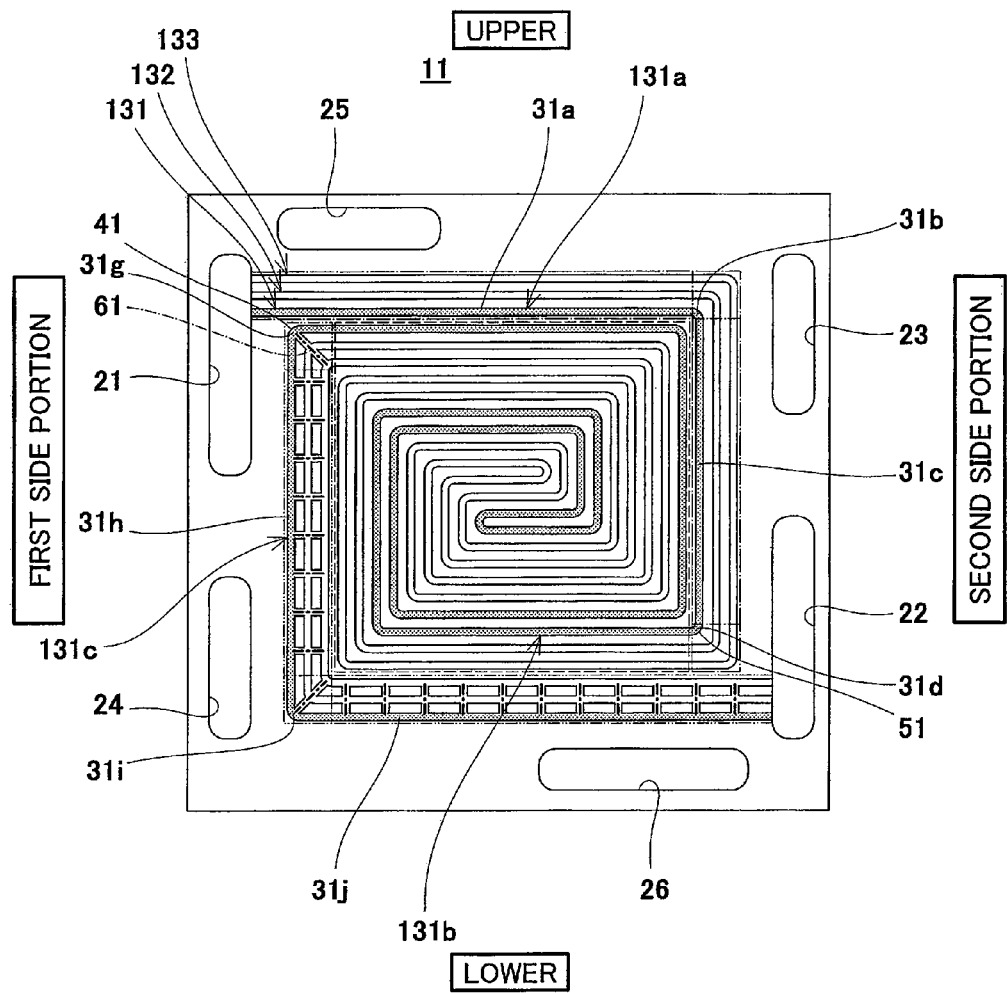
FIG. 4 is a schematic view showing a schematic configuration of a fuel cell separator according to a third embodiment of the invention.

FIG. 4 is a schematic view showing a schematic configuration of a fuel cell separator according to a third embodiment of the invention.

As shown in FIG. 4, the fuel cell separator (cathode separator) 11 of the third embodiment is the same in basic configuration as the fuel cell separator (cathode separator) 11 of the first embodiment except that, in the third embodiment, a plurality of communication channels 61 are arranged at specified intervals in the specific portion of the first oxidizing gas channel 131, the specific portion extending between the first portion 41 and the downstream end of the first oxidizing gas channel 131, such that the first oxidizing gas channel 131 and the second oxidizing gas channels 132, 133 are communicated with one another.

In the fuel cell 100 having the fuel cell separator 11 thus configured according to the third embodiment, variations in the supply amount of the reaction gas flowing in the reaction gas channels can be reduced thereby achieving a further improvement in the utilization efficiency of the reaction gas.

(Fourth Embodiment)

Figure 5:
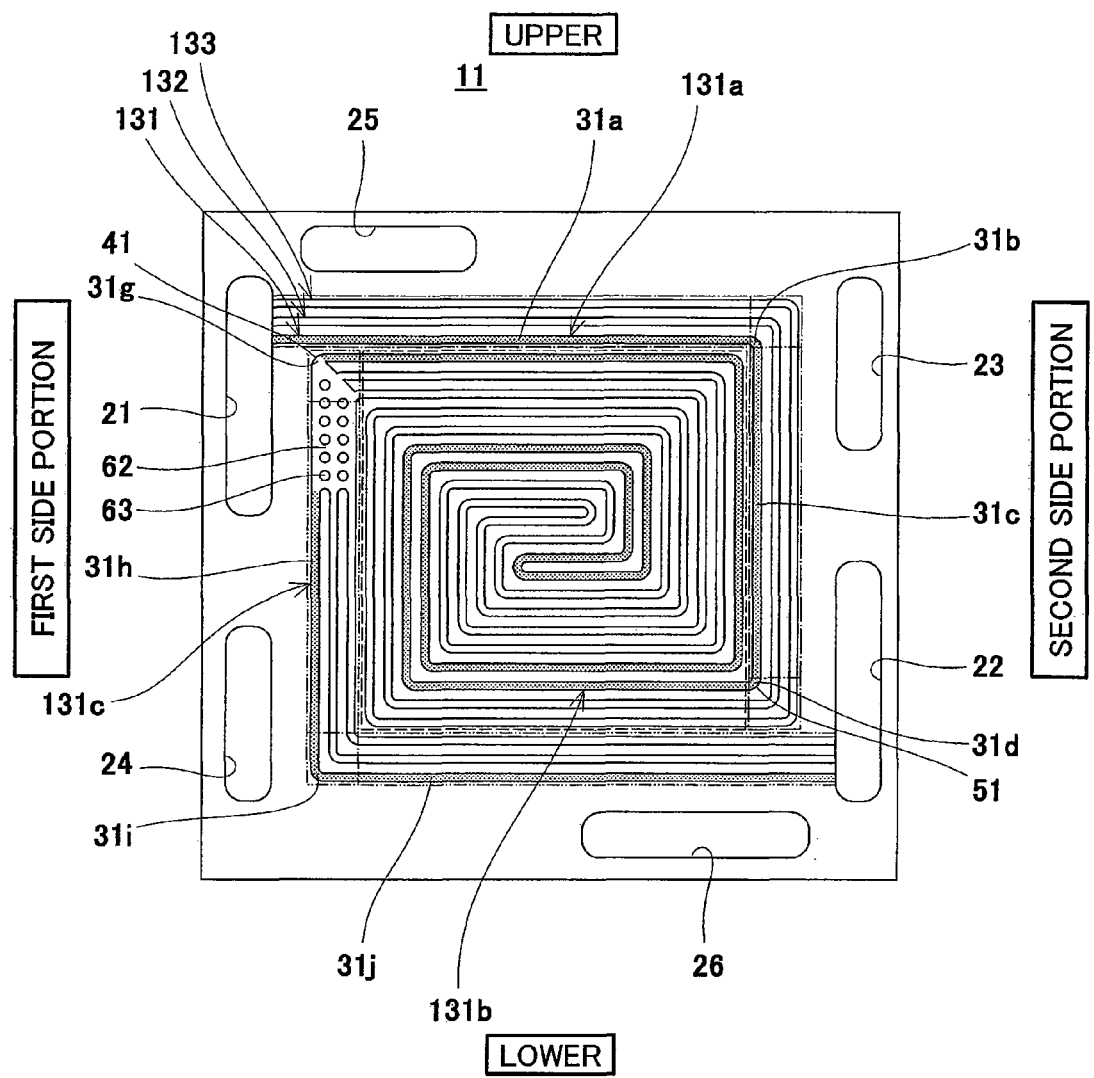
FIG. 5 is a schematic view showing a schematic configuration of a fuel cell separator according to a fourth embodiment of the invention.

FIG. 5 is a schematic view showing a schematic configuration of a fuel cell separator according to a fourth embodiment of the invention.

As shown in FIG. 5, the fuel cell separator (cathode separator) 11 of the fourth embodiment is the same in basic configuration as the fuel cell separator (cathode separator) 11 of the first embodiment except that, in the fourth embodiment, a recess 62 and a plurality of projections 63 standing on the bottom surface of the recess 62 are formed in the specific portion of the first oxidizing gas channel 131.

More specifically, the recess 62 is formed into a substantially trapezoidal shape when viewed in a thickness direction of the cathode separator 11. The recess 62 is connected, at its upstream end, to the first portion 41 of the first oxidizing gas channel 131 and connected, at its downstream end, to the first downstream linear portion 31h of the downstream portion 131c of the first oxidizing gas channel 131. The upstream and downstream ends of the recess 62 are respectively communicated with the first oxidizing gas channel 131 and the second oxidizing gas channels 132, 133.

The recess 62 has the same depth as of the first oxidizing gas channel 131 and the second oxidizing gas channels 132, 133, and the bottom surface of the recess 62 is provided with a number of island-like projections 63 (substantially cylindrical projections or, more particularly, substantially perfect cylindrical projections in this embodiment) that project from the bottom surface in the thickness direction. A plural number of such projections 63 (eleven projections 63 in this embodiment) are formed at a uniform pitch. Although the projections 63 are formed into a substantially cylindrical shape in this embodiment, the shape of the projections 63 is not limited to this but substantially cylindrical shapes, substantially triangular prism shapes and substantially quadrangular prism shapes may be employed. Although the section of the projections 63 when cut perpendicularly to the standing direction of the projections 63 has a substantially perfect circular shape, the shape of the cross-section is not necessarily limited to this but elliptical shape may be employed.

This allows the oxidizing gas (hereinafter referred to as "shortcut gas") which shortcuts from the upstream portion 131a of the first oxidizing gas channel 131 to the recess 62 (the first portion 41) and the oxidizing gas (flowing gas) that flows in the upstream side (midstream portion) of the recess 62 in the first oxidizing gas channel 131 and the second oxidizing gas channels 132, 133 to join together in the recess 62. The flow of the shortcut gas and the flowing gas, which have joined together at the recess 62, is disturbed and mixing of these gases is promoted by the plurality of projections 63 arranged in a striped shape in the recess 62, so that variations in the supply amount of the oxidizing gas is reduced. The mixture of the oxidizing gases branches in its flow at the downstream end of the recess 62 and flows into the first oxidizing gas channel 131 and the second oxidizing gas channels 132, 133.

Therefore, variations in the supply amount of the oxidizing gas that flow in the downstream portions of the first oxidizing gas channel 131 and the second oxidizing gas channels 132, 133 can be reduced, which entails an improvement in the utilization efficiency of the oxidizing gas.

(Fifth Embodiment)

Figure 6:
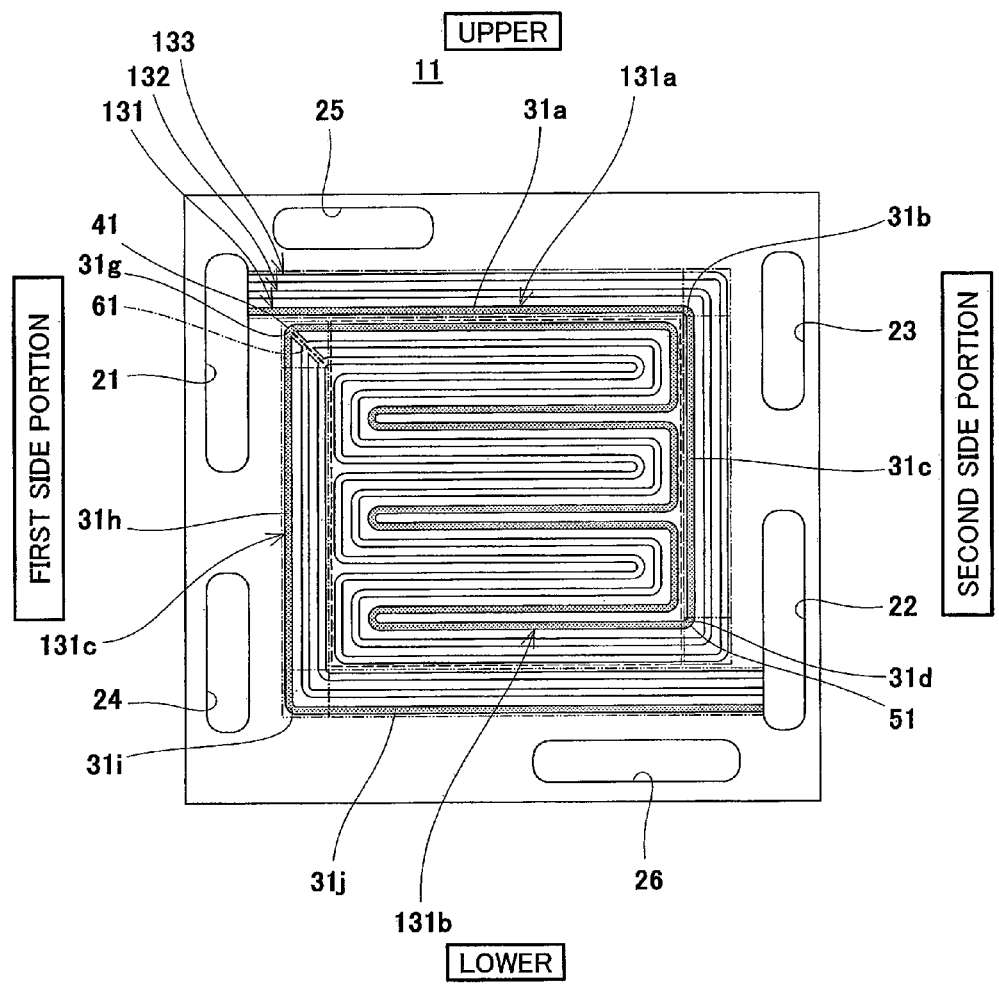
FIG. 6 is a schematic view showing a schematic configuration of a fuel cell separator according to a fifth embodiment of the invention.

FIG. 6 is a schematic view showing a schematic configuration of a fuel cell separator according to a fifth embodiment of the invention.

As shown in FIG. 6, the fuel cell separator (cathode separator) 11 of the fifth embodiment is the same in basic configuration as the fuel cell separator (cathode separator) 11 of the first embodiment except that, in the fifth embodiment, the midstream portions of the first oxidizing gas channel 131 and the second oxidizing gas channels 132, 133 are respectively formed in a serpentine shape. The configuration of the midstream portion 131b of the first oxidizing gas channel 131 will be described below.

The midstream portion 131b of the first oxidizing gas channel 131 horizontally extends a certain distance in the first lateral direction from the downstream end of the upstream portion 131a and then extends in the upward direction and turns, thereby making a 180 degrees turn. Thereafter, the midstream portion 131b horizontally extends a certain distance in the second lateral direction and then vertically extends a certain distance in the upward direction. After repeating this extending pattern twice and then horizontally extending a certain distance in the first lateral direction, the midstream portion 131b reaches the upstream end of the downstream portion 131c.

The fuel cell 100 having the fuel cell separator 11 thus configured according to the fifth embodiment achieves the same operational effect as of the fuel cell 100 of the first embodiment.

(Sixth Embodiment)

Figure 7:
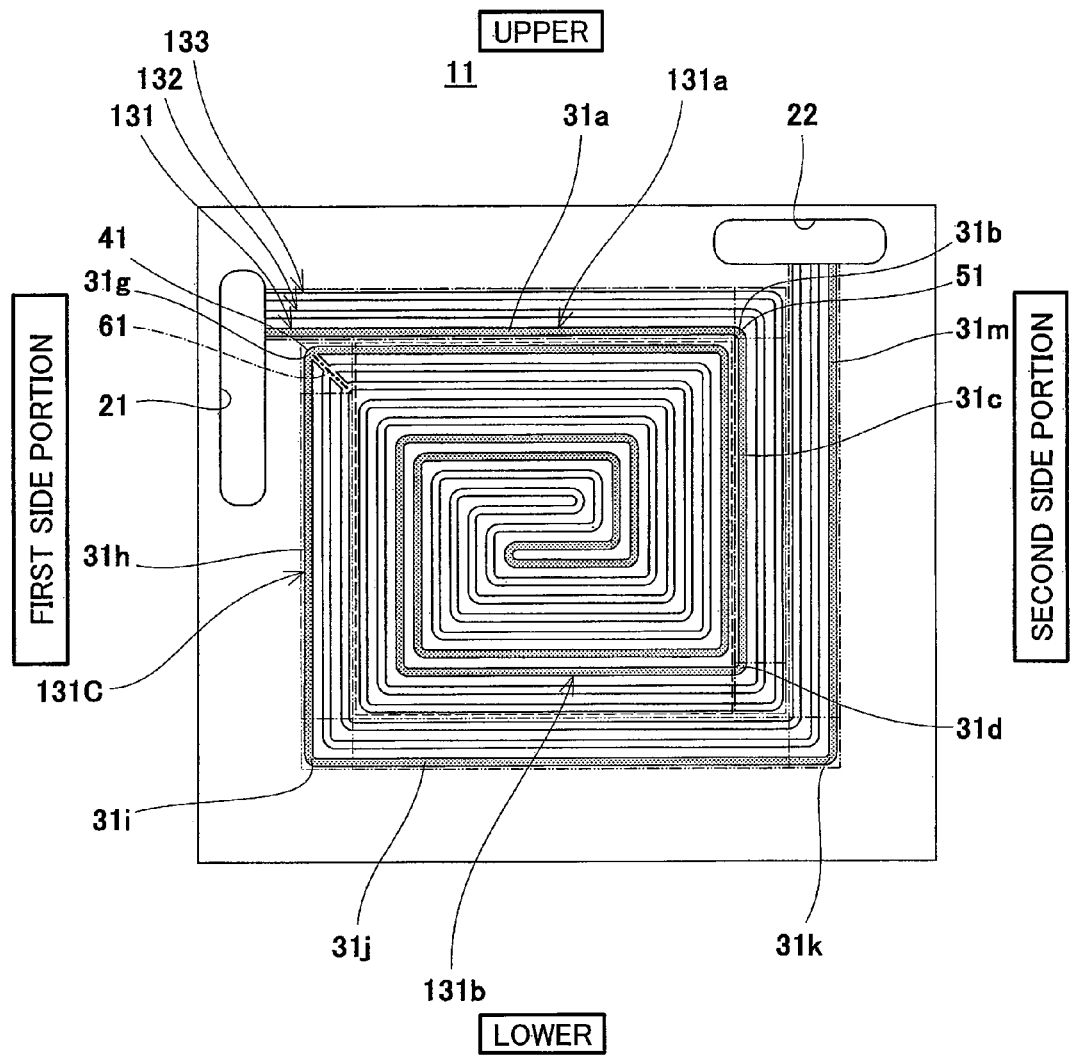
FIG. 7 is a schematic view showing a schematic configuration of a fuel cell separator according to a sixth embodiment of the invention.

FIG. 7 is a schematic view showing a schematic configuration of a fuel cell separator according to a sixth embodiment of the invention. In FIG. 7, only the oxidizing gas supply manifold hole 21 and the oxidizing gas discharge manifold hole 22 are shown and other manifold holes are omitted.

As shown in FIG. 7, the fuel cell separator (cathode separator) 11 of the sixth embodiment is the same in basic configuration as the fuel cell separator (cathode separator) 11 of the first embodiment except the positions of the oxidizing gas supply manifold hole 21 and the oxidizing gas discharge manifold hole 22 and the configurations of the downstream portions of the first oxidizing gas channel 131 and the second oxidizing gas channels 132, 133.

Concretely, the oxidizing gas discharge manifold hole 22 is provided in the upper part of the second side portion. The downstream portion 131c of the first oxidizing gas channel 131 is formed in a U-shape. More specifically, the downstream portion 131c does not differ from the first oxidizing gas channel 131 of the cathode separator 11 of the first embodiment in terms of the portion extending from the upstream end of the downstream portion 131c to the second downstream linear portion 31j. Connected to the downstream end of the second downstream linear portion 31j is the upstream end of a third downstream turn portion 31k that is bent, changing the flow of channel from a horizontal direction to a vertical direction. The third downstream turn portion 31k is connected, at its downstream end, to the upstream end of a third downstream linear portion 31m that extends vertically in the upward direction. The third downstream linear portion 31m is communicated, at its downstream end, with the oxidizing gas discharge manifold hole 22.

The second oxidizing gas channels 132, 133 are constructed similarly to the first oxidizing gas channel 131 and therefore a detailed description thereof is omitted. In addition, since the downstream portion 131c of the first oxidizing gas channel 131 is configured as described above, the second portion 51, which lies closest to the downstream end of the first oxidizing gas channel 131 among portions between the upstream end and the first portion 41 of the first oxidizing gas channel 131, is the first upstream turn portion 31b of the upstream portion 131a.

The fuel cell 100 having the fuel cell separator 11 thus configured according to the sixth embodiment achieves the same operational effect as of the fuel cell 100 of the first embodiment.

(Seventh Embodiment)

Figure 8:
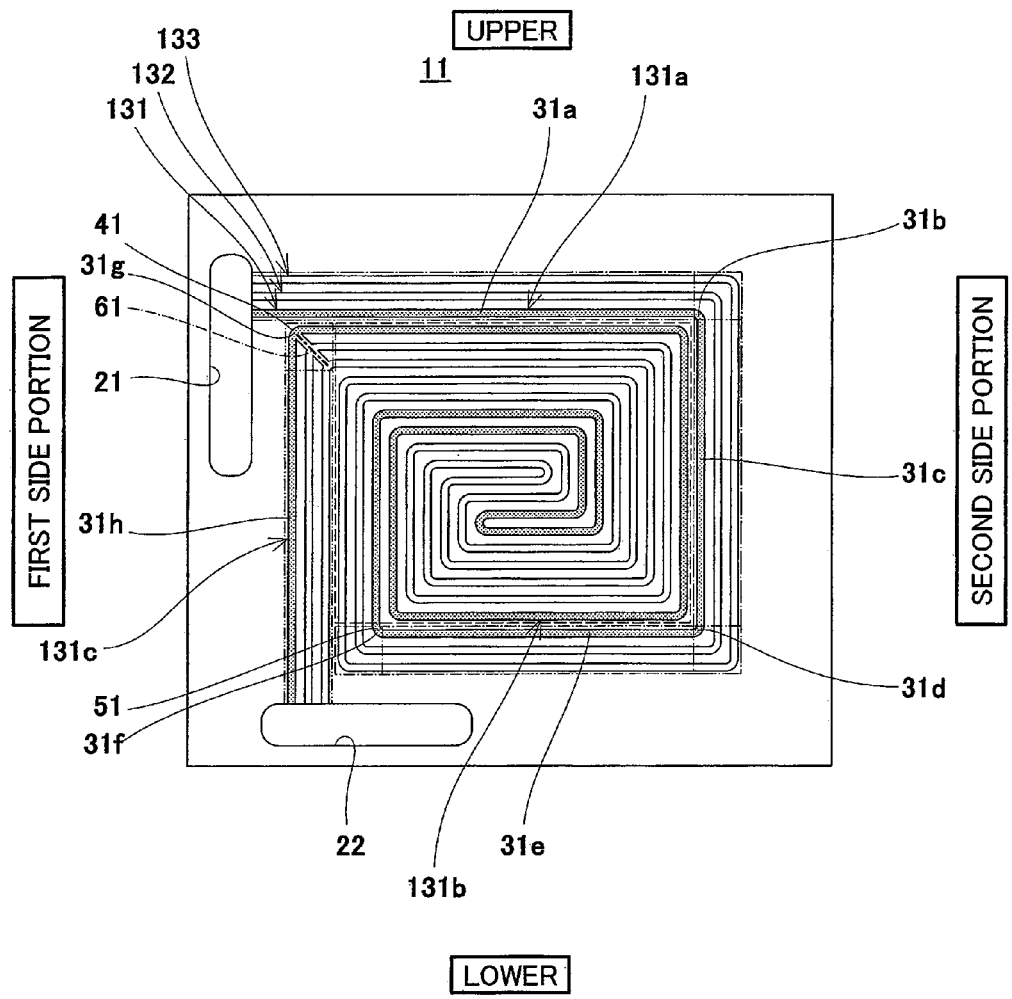
FIG. 8 is a schematic view showing a schematic configuration of a fuel cell separator according to a seventh embodiment of the invention.

FIG. 8 is a schematic view showing a schematic configuration of a fuel cell separator according to a seventh embodiment of the invention. In FIG. 8, only the oxidizing gas supply manifold hole 21 and the oxidizing gas discharge manifold hole 22 are shown and other manifold holes are omitted.

As shown in FIG. 8, the fuel cell separator (cathode separator) 11 of the seventh embodiment is the same in basic configuration as the fuel cell separator (cathode separator) 11 of the first embodiment except the positions of the oxidizing gas supply manifold hole 21 and the oxidizing gas discharge manifold hole 22 and the configurations of the upstream portions of the first oxidizing gas channel 131 and the second oxidizing gas channels 132, 133.

Concretely, the oxidizing gas discharge manifold hole 22 is provided in the lower part of the first side portion. The upstream portion 131a of the first oxidizing gas channel 131 is formed in a U-shape. More specifically, the upstream portion 131a does not differ from that of the first oxidizing gas channel 131 of the cathode separator 11 according to the first embodiment in terms of the portion extending from the upstream end of the upstream portion 131a to the second upstream turn portion 31d. Connected to the downstream end of the second upstream turn portion 31d is the upstream end of a third upstream linear portion 31e that horizontally extends in the first lateral direction. The third upstream linear portion 31e is connected, at its downstream end, to the upstream end of a third upstream turn portion 31f that is bent, changing the flow of channel from a horizontal direction to a vertical direction. The third upstream turn portion 31f is connected, at its downstream end, to the midstream portion 131b.

The second oxidizing gas channels 132, 133 are constructed similarly to the first oxidizing gas channel 131 and therefore a detailed description thereof is omitted. Since the upstream portion 131a of the first oxidizing gas channel 131 is configured as described above, the second portion 51, which lies closest to the downstream end of the first oxidizing gas channel 131 among portions between the upstream end and the first portion 41 of the first oxidizing gas channel 131, is the third upstream turn portion 31f of the upstream portion 131a.

The fuel cell 100 having the fuel cell separator 11 thus configured according to the seventh embodiment achieves the same operational effect as of the fuel cell 100 of the first embodiment.

(Eighth Embodiment)

Figure 9:
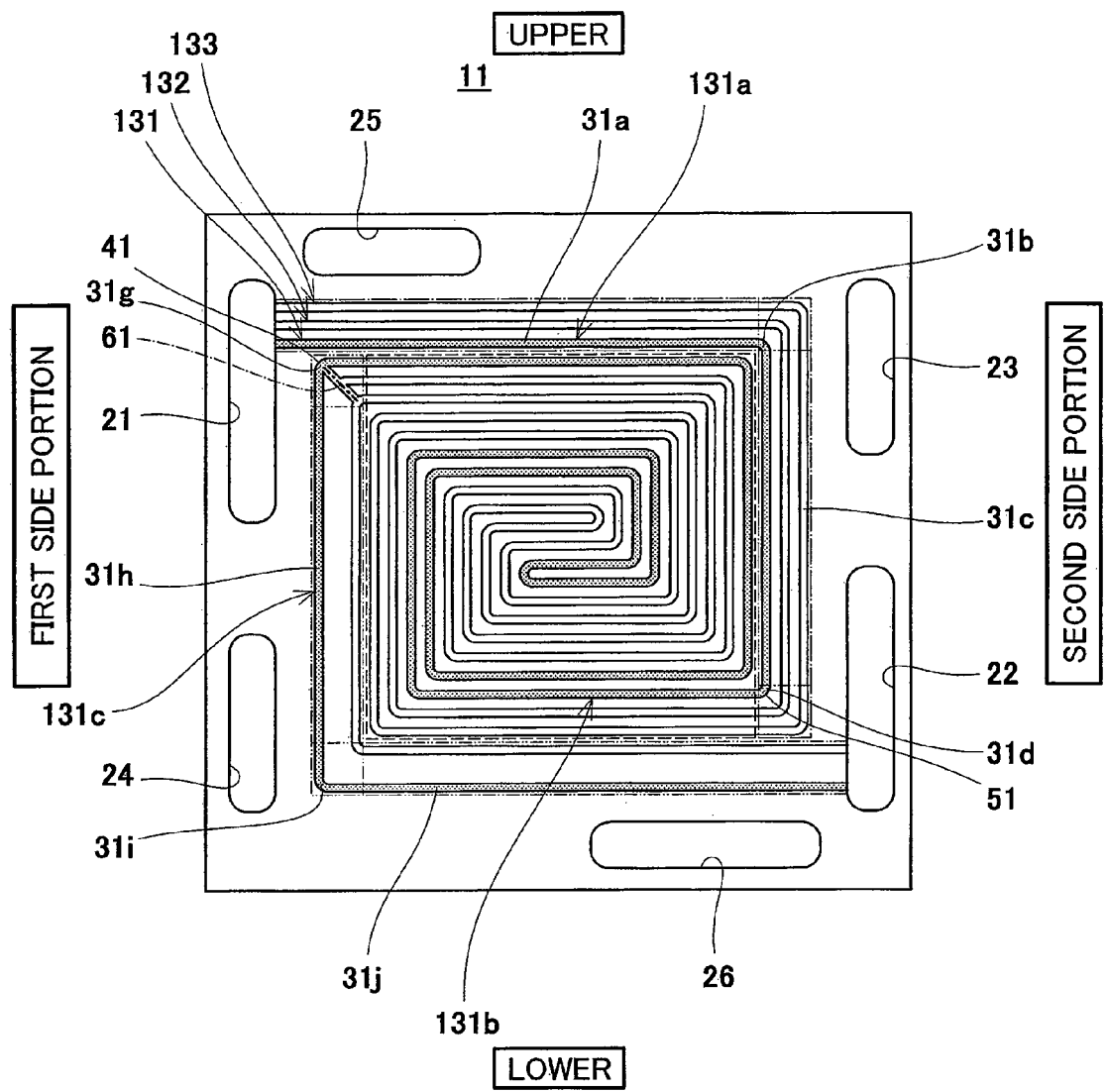
FIG. 9 is a schematic view showing a schematic configuration of a fuel cell separator according to an eighth embodiment of the invention.

FIG. 9 is a schematic view showing a schematic configuration of a fuel cell separator according to an eighth embodiment of the invention.

As shown in FIG. 9, the fuel cell separator (cathode separator) 11 of the eighth embodiment is the same in basic configuration as the fuel cell separator (cathode separator) 11 of the first embodiment except that, in the eighth embodiment, the downstream end of the second oxidizing gas channel 132 is connected to the communication channel 61.

The fuel cell 100 having the fuel cell separator 11 thus configured according to the eighth embodiment achieves the same operational effect as of the fuel cell 100 of the first embodiment.

Although the downstream end of the second oxidizing gas channel 132 is connected to the communication channel 61 in the eighth embodiment, the invention is not limited to this but is equally applicable to cases where the downstream end of the second oxidizing gas channel 133 is connected to the communication channel 61.

(Ninth Embodiment)

Figure 10:
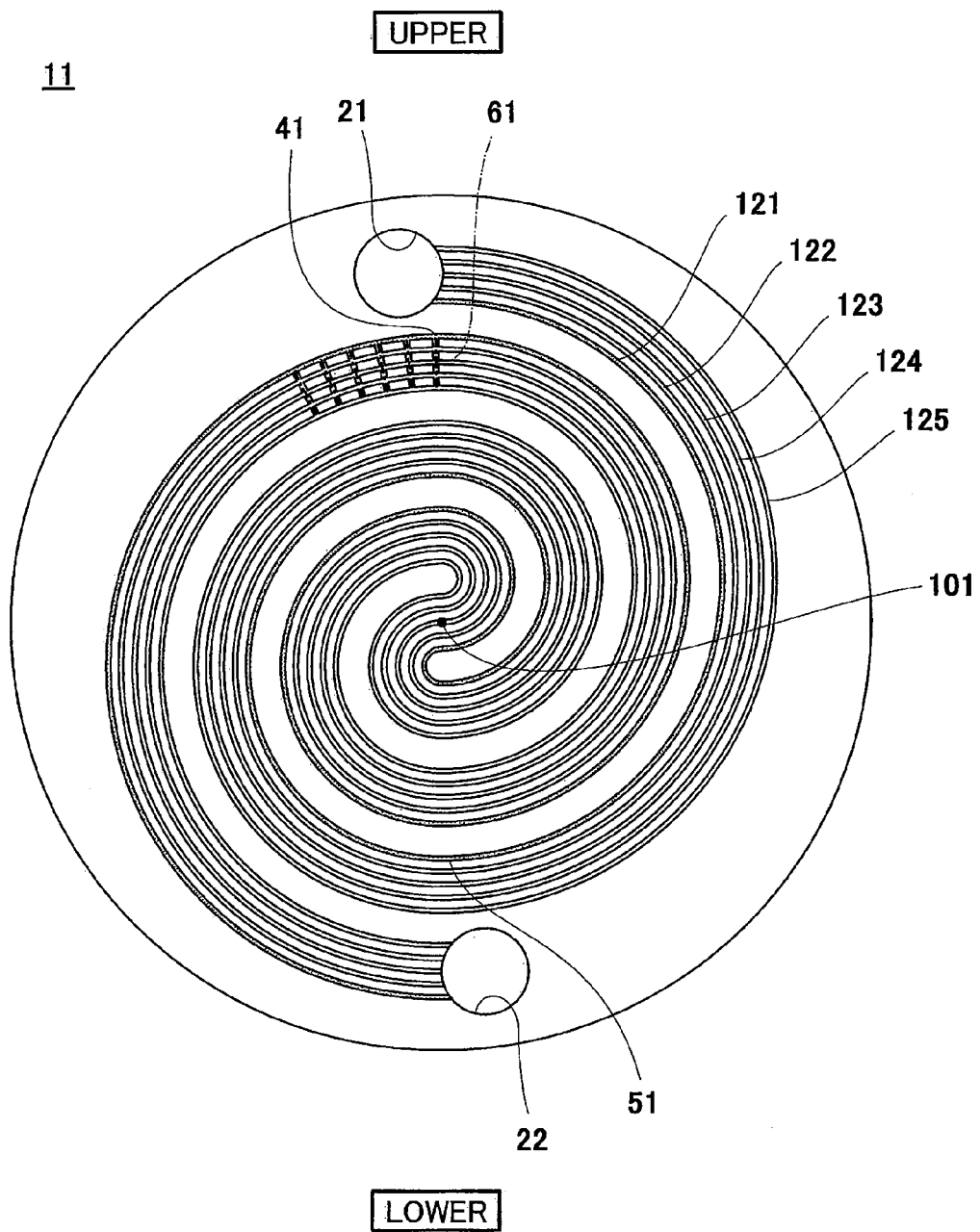
FIG. 10 is a schematic view showing a schematic configuration of a fuel cell separator according to a ninth embodiment of the invention.

FIG. 10 is a schematic view showing a schematic configuration of a fuel cell separator according to a ninth embodiment of the invention. In FIG. 10, only the oxidizing gas supply manifold hole 21 and the oxidizing gas discharge manifold hole 22 are shown and other manifold holes are omitted.

As illustrated in FIG. 10, the fuel cell separator (cathode separator) 11 of the ninth embodiment is formed in a disk-shape and its principal surface is provided with the first oxidizing gas channel 131 and four second oxidizing gas channels that run along one another. The oxidizing gas supply manifold hole 21 and the oxidizing gas discharge manifold hole 22 are opposed to each other with the central portion (i.e., a central axis 101) of the cathode separator 11 being located therebetween.

The first oxidizing gas channel 131 and the second oxidizing gas channels 132 to 135 are formed in a spiral shape when viewed as a whole. Concretely, they are formed to extend clockwise so as to draw an arc from their respective upstream ends to the central portion of the cathode separator 11 in a convergent fashion and then turn back at the central portion of the cathode separator 11 to extend counterclockwise so as to draw an arc toward the peripheral portion of the cathode separator 11 in a divergent fashion.

The first oxidizing gas channel 131 has the first portion 41 and the second portion 51. As described earlier, the first portion lies closest to the upstream end of the first oxidizing gas channel 131 among portions between the second portion 51 and the downstream end of the first oxidizing gas channel 131. In this embodiment, the first portion 41 is constituted by the portion that lies closest to the outer periphery of the separator 11 among portions intersecting the line that connects the upstream end of the first oxidizing gas channel 131 and the central axis 101. The second portion 51 lies closest to the downstream end of the first oxidizing gas channel 131 among portions between the upstream end and the first portion 41 of the first oxidizing gas channel 131. In this embodiment, the second portion 51 is constituted by the portion that lies closest to the outer periphery of the separator 11 among portions intersecting the line that connects the downstream end of the first oxidizing gas channel 131 and the central axis 101.

The portion (specific portion) located between the first portion 41 and the downstream end of the first oxidizing gas channel 131 is provided with a plurality of groove-shaped communication channels 61 that are arranged at specified intervals so as to make the first oxidizing gas channel 131 and the second oxidizing gas channels 132 to 135 to communicate with one another.

The fuel cell 100 having the fuel cell separator 11 thus configured according to the ninth embodiment achieves the same operational effect as of the fuel cell 100 of the first embodiment.

Although the first to ninth embodiments have been described with cases where the shortcut oxidizing gas is distributed by providing the communication channel(s) 61 in the specific portion of the first oxidizing gas channel 131, the invention is not necessarily limited to this but is equally applicable to cases where the recess 62 and the projections 63 are provided like the fourth embodiment to thereby mix the shortcut oxidizing gas and distribute the mixed oxidizing gas.

Although the first to ninth embodiments have been described with cases where the downstream ends of the plurality of oxidizing gas channels 131 to 135 are communicated with the oxidizing gas discharge manifold hole 22, the invention is not necessarily limited to this but is equally applicable to cases where the downstream end of at least one of the plurality of second oxidizing gas channels 132 to 135 is connected to the communication channel 61.

(Tenth Embodiment)

Figure 11:
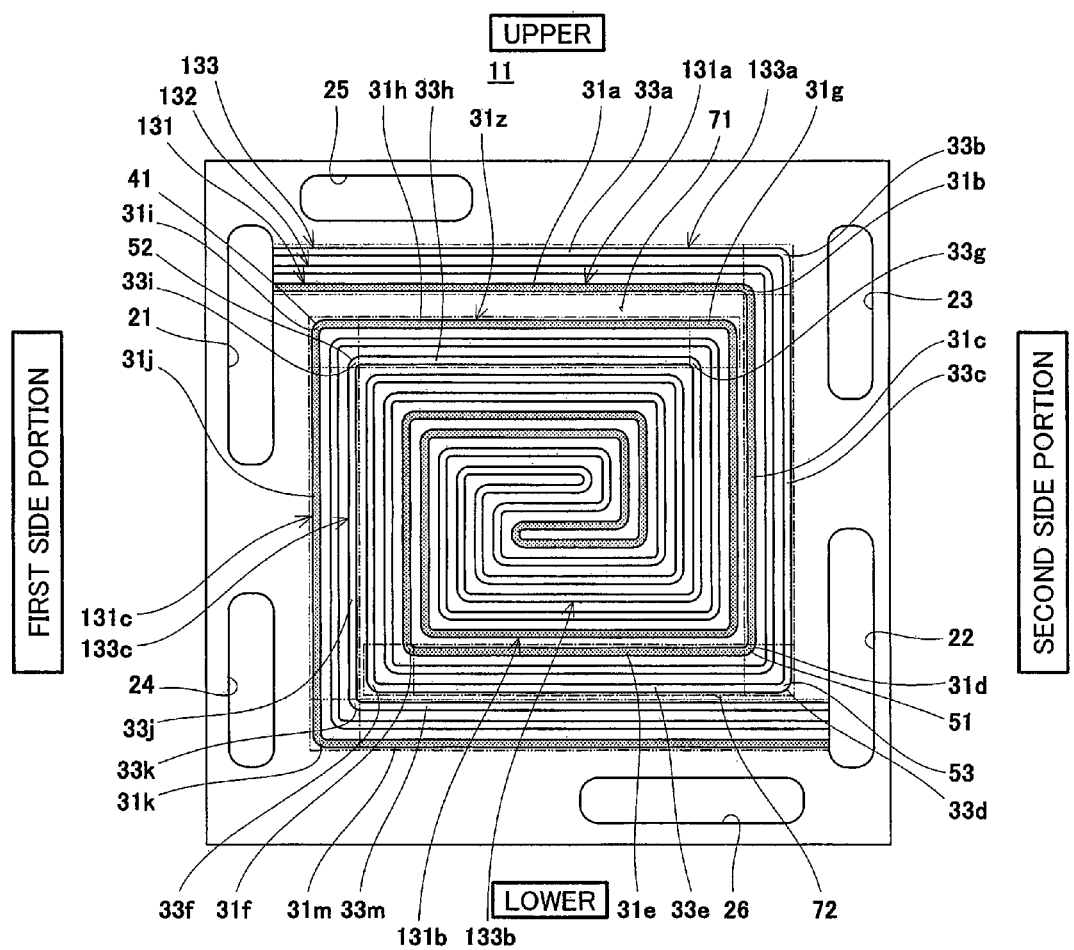
FIG. 11 is a schematic view showing a schematic configuration of a fuel cell separator according to a tenth embodiment of the invention.

FIG. 11 is a schematic view showing a schematic configuration of a fuel cell separator according to a tenth embodiment of the invention.

The fuel cell separator according to the tenth embodiment of the invention is a plate-shaped fuel cell separator which has a reaction gas supply manifold hole penetrating through the separator in its thickness direction thereof; a reaction gas discharge manifold hole penetrating through the separator in its thickness direction thereof; and a plurality of reaction gas channels composed of grooves which is formed in at least one of the principal surfaces of the fuel cell separator such that their upstream ends are connected to the above reaction gas supply manifold hole whereas their downstream ends are connected to the above reaction gas discharge manifold hole and such that they are bent running along one another. Among the plurality of reaction gas channels, either one of the outermost pair of reaction gas channels constitutes a first reaction gas channel and the other constitutes a third reaction gas channel. The first reaction gas channel has a first portion and a second portion located upstream of the first portion. The first portion lies closest to the upstream end among portions between the second portion and the downstream end of the first reaction gas channel. The second portion lies closest to the downstream end among portions between the upstream end and the first portion of the first reaction gas channel. The third reaction gas channel does not exist between the first portion and the upstream end but exist between the second portion and the downstream end. Among a plurality of ribs each of which is formed between adjacent grooves, at least either the rib defined only by the groove of the first reaction gas channel or the rib defined only by the third reaction gas channel (hereinafter referred to as the "specified rib") has a larger width than other ribs than the specified rib. Herein, the specified rib is the first rib defined only by the grooves that constitute the first reaction gas channel.

Concretely, as illustrated in FIG. 11, one of the principal surfaces of the cathode separator 11 is provided with grooves 131 to 133 that are arranged so as to establish fluid communication between the oxidizing gas supply manifold hole 21 and the oxidizing gas discharge manifold hole 22 and so as to supply the oxidizing gas to the entire principal surface of the cathode 4b. The portion between every adjacent grooves formed in the principal surface of the cathode separator 11 constitutes a rib that is in contact with the cathode 4b. The grooves 131 to 133 constitute the first oxidizing gas channel 131 and the second oxidizing gas channels 132, 133, respectively. The first oxidizing gas channel 131 and the second oxidizing gas channels 132, 133 are so formed as to run along one another. The expression "the oxidizing gas channels run along one another" as stated herein means that the plurality of oxidizing gas channels are arranged along one another. Of the outermost pair of grooves 131, 133, the groove 131 constitutes the first oxidizing gas channel 131 whereas the other groove 133 constitutes the third oxidizing gas channel (the third reaction gas channel) 133. That is, the outermost one 133 of the second oxidizing gas channels 132, 133 constitutes the third oxidizing gas channel 133. The second oxidizing gas channel 132 is configured similarly to the first and third oxidizing gas channels 131, 133 and therefore only the first and third oxidizing gas channels 131, 133 will be explained in the following description.

The first and third oxidizing gas channels 131, 133 are respectively composed of a substantially U-shaped upstream portion 131a (133a) (indicated by dashed-dotted line in FIG. 11); a substantially U-shaped downstream portion 131c (133c) (indicated by dashed-two dotted line in FIG. 11); and a spiral shaped midstream portion 131b (133b). The upstream portion 131a (133a) is communicated, at its upstream end, with the oxidizing gas supply manifold hole 21. The downstream portion 131c (133c) is communicated, at its downstream end, with the oxidizing gas discharge manifold hole 22. The midstream portion 131b (133b) is connected, at its upstream end, to the downstream end of the upstream portion 131a (133a) and, at its downstream end, to the upstream end of the downstream portion 131c (133c). The midstream portion 131b (133b) is surrounded by the upstream portion 131a (133a) and the downstream portion 131c (133c).

The upstream portions 131a, 133a are each composed of a first upstream linear portion 31a (33a), a first upstream turn portion 31b (33b), a second upstream linear portion 31c (33c), a second upstream turn portion 31d (33d), a third upstream linear portion 31e (33e) and a third upstream turn portion 31f (33f).

The first upstream linear portions 31a, 33a are formed so as to be communicated, at their respective upstream ends, with the oxidizing gas supply manifold hole 21 and extend respectively from the first side portion to the second side portion of the cathode separator 11 (in a horizontal direction). The first upstream turn portions 31b, 33b are formed so as to be connected, at their respective upstream ends, to the downstream ends of the first upstream linear portions 31a, 33a respectively and are bent respectively to change the flow of channel from the horizontal direction to a vertical direction of the cathode separator 11. The second upstream linear portions 31c, 33c are formed so as to be connected, at their respective upstream ends, to the downstream ends of the first upstream turn portions 31b, 33b respectively and extend respectively from the upper portion to the lower portion of the cathode separator 11 (in the vertical direction). The second upstream turn portions 31d, 33d are formed so as to be connected, at their respective upstream ends, to the downstream ends of the second upstream linear portions 31c, 33c respectively and are bent respectively to change the flow of channel from the vertical direction to the horizontal direction. The third upstream linear portions 31e, 33e are formed so as to be connected, at their respective upstream ends, to the downstream ends of the second upstream turn portions 31d, 33d respectively, and horizontally extend from the second side portion to the first side portion respectively. The third upstream turn portions 31f, 33f are so formed as to be connected, at their respective upstream ends, to the downstream ends of the third upstream linear portions 31e, 33e respectively and are bent respectively to change the flow of channel from the horizontal direction to the vertical direction of the cathode separator 11.

The midstream portions 131b, 133b are formed in a spiral shape. Concretely, they are formed so as to extend clockwise from the peripheral portion of the cathode separator 11 to the central portion of the cathode separator 11 in a convergent fashion and then turn back at the central portion to extend counterclockwise toward the peripheral portion in a divergent fashion.

More specifically, the midstream portions 131b, 133b vertically extend a certain distance in a direction from the lower portion to the upper portion of the cathode separator 11 (this direction is hereinafter referred to as the "upward direction"), starting from the downstream ends of the third upstream turn portions 31f, 33f of the upstream portions 131a, 133a respectively, and then horizontally extends a certain distance in a direction from the first side portion to the second side portion (this direction is hereinafter referred to as the "second lateral direction"). Thereafter, they vertically extend a certain distance in a direction from the upper portion to the lower portion of the cathode separator 11 (this direction is hereinafter referred to as "the downward direction") and then horizontally extend in the first lateral direction to reach the central portion of the cathode separator 11. The midstream portions 131b, 133b then turn back at the central portion of the cathode separator 11 to horizontally extend a certain distance in the second lateral direction. Thereafter, the midstream portions 131b, 133b vertically extend a certain distance in the upward direction of the cathode separator 11 and then horizontally extend a certain distance in the first lateral direction. Then, they vertically extend a certain distance in the downward direction, horizontally extend a certain distance in the second lateral direction, and vertically extend a certain distance in the upward direction to reach the upstream ends of the downstream portions 131c, 133c respectively.

The downstream portions 131c, 133c are each composed of a first downstream turn portion 31g (33g), a first downstream linear portion 31h (33h), a second downstream turn portion 31i (33i), a second downstream linear portion 31j (33j), a third downstream turn portion 31k (33k) and a third downstream linear portion 31m (33m).

The first downstream turn portions 31g, 33g are formed so as to be connected, at their upstream ends, to the downstream ends of the midstream portions 131b, 133b respectively and is bent to change the flow of channel from the vertical direction to the horizontal direction. The first downstream linear portions 31h, 33h are formed so as to be connected, at their upstream ends, to the downstream ends of the first downstream turn portions 31g, 33g respectively and extend horizontally in the first lateral direction. The second downstream turn portions 31i, 33i are formed so as to be connected, at their upstream ends, to the downstream ends of the first downstream linear portions 31h, 33h respectively and are bent to change the flow of channel from the horizontal direction to the vertical direction. The second downstream linear portions 31j, 33j are formed so as to be connected, at their upstream ends, to the second downstream turn portions 31i, 33i respectively and vertically extend in the downward direction. The second downstream turn portions 31k, 33k are so formed as to be connected, at their upstream ends, to the second downstream linear portions 31j, 33j respectively and are bent to change the flow of channel from the vertical direction to the horizontal direction. The third downstream linear portions 31m, 33m are so formed as to be connected, at their upstream ends, to the downstream ends of the second downstream turn portions 31k, 33k respectively and extend horizontally in the second lateral direction, with their downstream ends being respectively communicated with the oxidizing gas discharge manifold hole 22.

Thus, the first and third oxidizing gas channels 131, 133 are constituted by the linear portions extending in the vertical direction or horizontal direction and the turn portions that is bent to change the flow of channel from the vertical direction to the horizontal direction or vice versa, so that they are bent when viewed as a whole. The oxidizing gas channel 132 is arranged along the first and third oxidizing gas channels 131, 133. The second oxidizing gas channel 132 and the third oxidizing gas channel 133 do not exist between the first portion 41 (described later) of the first oxidizing gas channel 131 and the upstream end of the first oxidizing gas channel 131 with respect to directions parallel to the principal surface of the cathode separator 11. The second oxidizing gas channel 132 and the third oxidizing gas channel 133 exist between the second portion 51 (described later) of the first oxidizing gas channel 131 and the downstream end of the first oxidizing gas channel 131 with respect to directions parallel to the principal surface of the cathode separator 11.

The downstream portion 131c of the first oxidizing gas channel 131 has the first portion 41 and the upstream portion 131a has the second portion 51. The first portion 41 lies closest to the upstream end of the first oxidizing gas channel 131 among portions between the second portion 51 and the downstream end of the first oxidizing gas channel 131. In other words, the first portion 41 has the greatest pressure gradient relative to the upstream portion 131a among portions in the downstream portion 131c of the first oxidizing gas channel 131 (i.e., the first portion 41 has the largest amount of reaction gas which shortcuts from the upstream portion 131a of the first oxidizing gas channel 131). Concretely, in this embodiment, the portion, which lies closest to the upstream end of the first oxidizing gas channel 131 among portions in the first downstream turn portion 31i of the downstream portion 131c, constitutes the first portion 41.

The second portion 51 lies closest to the downstream end of the first oxidizing gas channel 131 among portions between the upstream end and the first portion 41 of the first oxidizing gas channel 131. In other words, the second portion 51 is the region that is the farthest from the upstream end of the first oxidizing gas channel 131 with respect to the direction from the upstream end to the downstream end of the first oxidizing gas channel 131 among portions between the upstream end of the first oxidizing gas channel 131 and the first portion 41 and that has the greatest pressure gradient relative to the downstream portion 131c among portions in the upstream portion 131a of the first oxidizing gas channel 131. Concretely, in this embodiment, the second upstream turn portion 31d of the upstream portion 131a constitutes the second portion 51.

Further, the downstream portion 133c of the third oxidizing gas channel 133 has a third portion 52 and its upstream portion 133a has a fourth portion 53. The third portion 52 is the portion of the third oxidizing gas channel 133 that corresponds to the first portion 41 of the first oxidizing gas channel 131 and is the second downstream turn portion 33i that lies closest to the upstream end of the third oxidizing gas channel 133 among portions between the fourth portion 53 and the downstream end. The fourth portion 53 is the portion of the third oxidizing gas channel 133 that corresponds to the second portion 51 of the first oxidizing gas channel 131 and is the downstream end portion of the standing portion of the second upstream turn portion 33d, which lies closest to the downstream end of the third oxidizing gas channel 133 among portions between the upstream end of the third oxidizing gas channel 133 and the third portion 52.

Of the plurality of ribs formed between the adjacent grooves 131 to 133, the rib defined only by the groove 131 that constitutes the first oxidizing gas channel 131 constitutes a first rib 71 and the rib defined only by the groove 133 that constitutes the third oxidizing gas channel 133 constitutes a second rib 72. In the first embodiment, the portion (i.e., the portion running along the first upstream linear portion 31a) of the first rib 71 extending between the upstream end of the first oxidizing gas channel 131 and the downstream end of the first upstream linear portion 31a has a larger width than other ribs than the first rib 71, and the first rib 71 constitutes a specific rib. It should be noted that other portions than the portion running along the first upstream linear portion 31a of the first rib 71 have substantially the same width as that of other ribs.

This makes it possible to reduce the pressure gradient caused by the pressure difference between the oxidizing gas flowing in the first upstream linear portion 31a of the first oxidizing gas channel 131 and the oxidizing gas flowing in a channel 31z (constituted by the horizontally extending portion of the first downstream turn portion 31g, the first downstream linear portion 31h, and the horizontally extending portion of the second downstream turn portion 31i), the channel 31z lying closest to the first upstream linear portion 31a. In other words, the fluid resistance occurring when the oxidizing gas flows in the cathode gas diffusion layer 3b (more precisely, the portion of the cathode gas diffusion layer 3b that corresponds to the portion of the first rib 71 running along the first upstream linear portion 31a when viewed in a thickness direction of the fuel cell 100) can be increased. Therefore, the flow rate of the oxidizing gas which shortcuts from the first upstream linear portion 31a of the first oxidizing gas channel 131 into the channel 31z can be reduced.

[Operational Effect of Fuel Cell]

Next, the operational effect of the fuel cell 100 of the tenth embodiment will be described with reference to FIGS. 1 and 11.

As discussed earlier, since there is a significant pressure difference between the oxidizing gas flowing in the first upstream linear portion 31a of the upstream portion 131a of the first oxidizing gas channel 131 and the oxidizing gas flowing in the channel 31z that lies closest to the first upstream linear portion 31a of the first oxidizing gas channel 131, a pail of the oxidizing gas flowing in the upstream portion 131a flows into the channel 31z (especially, the first portion 41 of the first oxidizing gas channel 131) by way of the cathode gas diffusion layer 3b.

In addition, since the oxidizing gas flowing in the upstream portion 131a of the first oxidizing gas channel 131 shortcuts, a pressure difference is caused between the oxidizing gas flowing in the upstream portions of the second and third oxidizing gas channels 132, 133 and the oxidizing gas flowing in the upstream portion 131a of the first oxidizing gas channel 131. This pressure difference causes a part of the oxidizing gas flowing in the upstream portions of the second and third oxidizing gas channels 132, 133 to flow into the upstream portion 131a of the first oxidizing gas channel 131. Then, a part of the oxidizing gas, which has flown into the first oxidizing gas channel 131 from the second and third oxidizing gas channels 132, 133, flows into the channel 31z of the first oxidizing gas channel 131 (especially, the first portion 41 of the first oxidizing gas channel 131). When taken as a whole, a part of the oxidizing gas flowing in the first oxidizing gas channel 131 and the second and third oxidizing gas channel 132, 133 flows into the channel 31z (especially, the first portion 41) of the first oxidizing gas channel 131.

A part of the oxidizing gas flowing in the first oxidizing gas channel 131 and the second and third oxidizing gas channels 132,133 accordingly shortcuts into the channel 31z (especially, the first portion 41) of the first oxidizing gas channel 131, so that it is discharged through the oxidizing gas discharge manifold hole 22 without being used in the reaction. As a result, the utilization efficiency of the reaction gas drops.

Of the ribs formed between adjacent pairs of grooves 131 to 133 in the fuel cell 100 of the first embodiment, the portion (located between the first upstream linear portion 31a and the channel 31z) of the rib 71, which runs along the first upstream linear portion 31a and is defined only by the groove 131 that constitutes the first oxidizing gas channel 131, has a larger width than other ribs. This makes it possible to reduce the pressure gradient caused by the pressure difference between the oxidizing gas flowing in the first upstream linear portion 31a of the first oxidizing gas channel 131 and the oxidizing gas flowing in the channel 31z of the first oxidizing gas channel 131. In other words, the fluid resistance occurring when the oxidizing gas flows in the cathode gas diffusion layer 3b (more precisely, the portion of the cathode gas diffusion layer 3b that corresponds to the portion of the first rib 71 running along the first upstream linear portion 31a when viewed in a thickness direction of the fuel cell 100) can be increased. Therefore, the flow rate of the oxidizing gas which shortcuts from the first upstream linear portion 31a of the first oxidizing gas channel 131 into the channel 31z can be reduced.

In addition, since the oxidizing gas which shortcuts from the upstream portion 131a of the first oxidizing gas channel 131 into the channel 31z can be reduced, the pressure difference between the oxidizing gas flowing in the upstream portions of the second and third oxidizing gas channels 132,133 and the oxidizing gas flowing in the upstream portion 131a of the first oxidizing gas channel 131 can be reduced, so that the oxidizing gas which shortcuts from the upstream portions of the second and third oxidizing gas channels 132,133 into the channel 31z by way of the upstream portion 131a of the first oxidizing gas channel 131 can be reduced.

The part of the oxidizing gas flowing in the first oxidizing gas channel 131 and the second oxidizing gas channels 132, 133, which part is discharged through the oxidizing gas discharge manifold hole 22 without being used for the reaction with the fuel gas, can be reduced, thereby increasing the utilization efficiency of the reaction gas.

In the fuel cell 100 of the tenth embodiment, the shortcut of the reaction gas and therefore the amount of reaction gas discharged without contributing to the reaction can be reduced, which leads to an improvement in the utilization efficiency of the reaction gas.

(Eleventh Embodiment)

Figure 12:
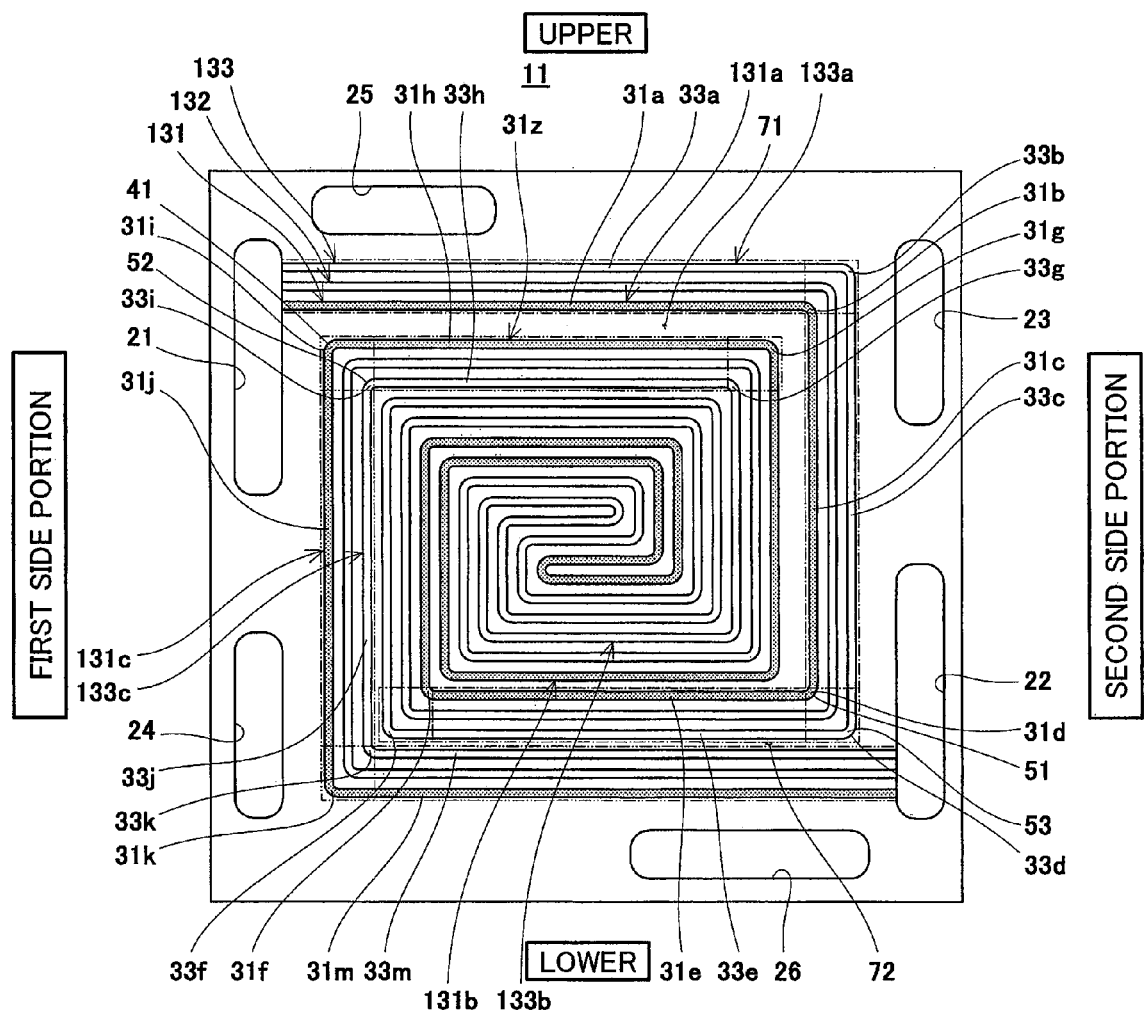
FIG. 12 is a schematic view showing a schematic configuration a fuel cell separator according to an eleventh embodiment of the invention.

FIG. 12 is a schematic view showing a schematic configuration of a fuel cell separator according to an eleventh embodiment of the invention.

As shown in FIG. 12, the fuel cell separator (cathode separator) 11 of the eleventh embodiment is the same in basic configuration as the fuel cell separator (cathode separator) 11 of the first embodiment except the configuration of the first rib 71. Concretely, the portion of the first rib 71 (hereinafter referred to simply as "the portion"), which runs along the portion extending from the upstream end of the first oxidizing gas channel 131 to the second portion 51, has a larger width than other ribs. That is, in the fuel cell separator of the eleventh embodiment of the invention, the portion of the first rib that corresponds to the portion extending from the upstream end of the first oxidizing gas channel to the second portion has a larger width than other portions.

The fuel cell having the fuel cell separator thus constructed according to the eleventh embodiment can achieve the same operational effect as of the fuel cell 100 of the tenth embodiment.

(Twelfth Embodiment)

Figure 13:
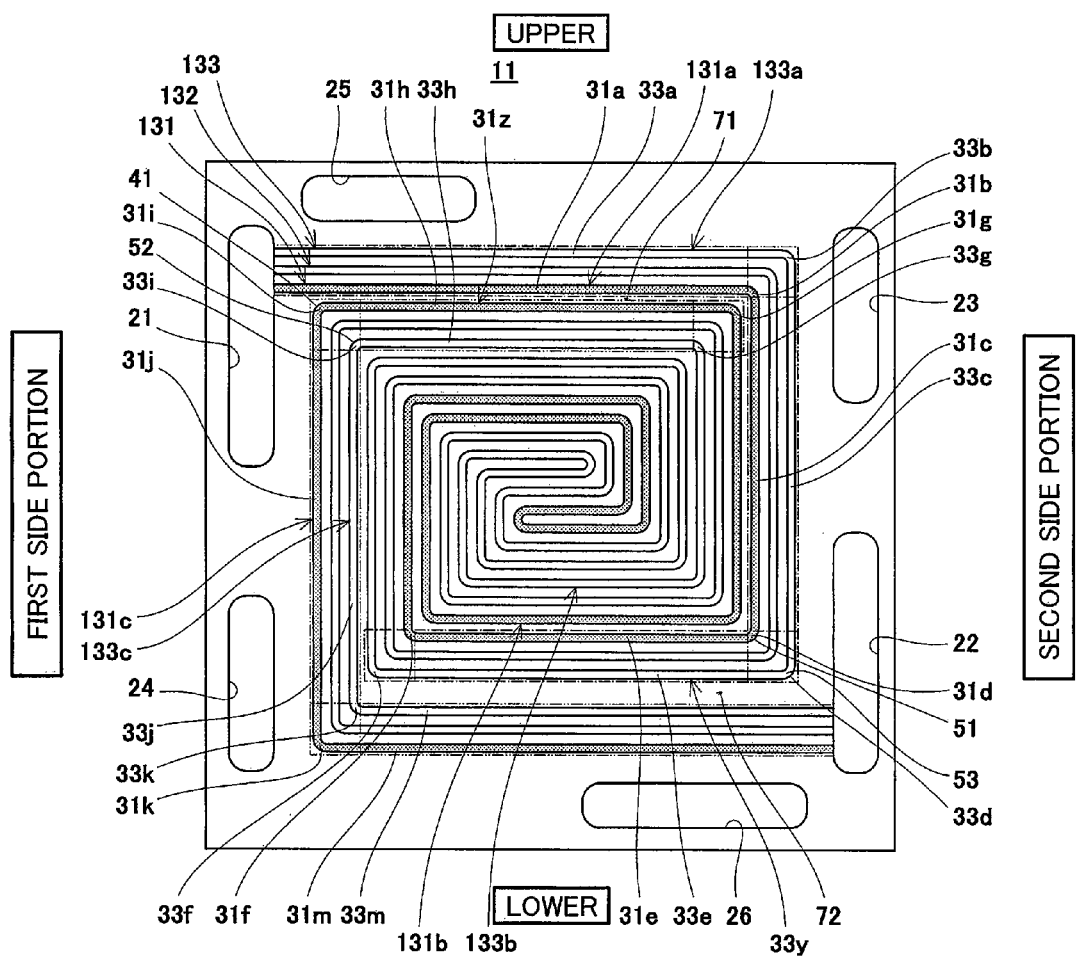
FIG. 13 is a schematic view showing a schematic configuration of a fuel cell separator according to a twelfth embodiment of the invention.

FIG. 13 is a schematic view showing a schematic configuration of a fuel cell separator according to a twelfth embodiment of the invention.

In the fuel cell separator according to the twelfth embodiment of the invention, the specific rib is the second rib defined only by the groove that constitutes the third reaction gas channel.

As shown in FIG. 13, the fuel cell separator (cathode separator) 11 of the twelfth embodiment is the same in basic configuration as the fuel cell separator (cathode separator) 11 of the tenth embodiment except that, instead of the first rib 71, the second rib 72 defined only by the groove 133 that constitutes the third oxidizing gas channel 133 is so formed as to have a larger width than other ribs (including the first rib 71) in the twelfth embodiment.

Concretely, the portion of the second rib 72, which runs along the third downstream linear portion 33m of the third oxidizing gas channel 133, has a larger width than other portions of the second rib 72 (this portion is located between the third downstream linear portion 33m and the portion (hereinafter referred to as the "channel 33y") constituted by the horizontally extending portion of the second upstream turn portion 33d, the third upstream linear portion 33e and the horizontally extending portion of the third upstream turn portion 33f). The second rib 72 constitutes the specific rib. This makes it possible to reduce the oxidizing gas which shortcuts from the channel 33y (especially, the fourth portion 53) of the third oxidizing gas channel 133 into the third downstream linear portion 33m of the third oxidizing gas channel 133.

Next, the operational effect of the fuel cell 100 having the fuel cell separator 11 according to the twelfth embodiment will be explained.

As discussed earlier, since the pressure difference between the oxidizing gas flowing in the channel 33y of the third oxidizing gas channel 133 and the oxidizing gas flowing in the downstream portion 133c (more precisely, the third downstream linear portion 33m) of the third oxidizing gas channel 133 is significant, a part of the oxidizing gas flowing in the upstream portion 133a (especially, the fourth portion 53 of the third oxidizing gas channel 133) flows into the channel 33y by way of the cathode gas diffusion layer 3b.

In addition, since the oxidizing gas, which flows in the upstream portion 133a of the third oxidizing gas channel 133, shortcuts, a pressure difference occurs between the oxidizing gas flowing in the upstream portions of the first oxidizing gas channel 131 and the second oxidizing gas channel 132 and the oxidizing gas flowing in the upstream portion 133a of the third oxidizing gas channel 133. This pressure difference causes a part of the oxidizing gas flowing in the upstream portions of the first oxidizing gas channel 131 and the second oxidizing gas channel 132 to flow into the upstream portion 133a of the third oxidizing gas channel 133. Then, a part of the oxidizing gas, which has flown from the first oxidizing gas channel 131 and the second oxidizing gas channel 132 into the third oxidizing gas channel 133, flows into the channel 33y of the third oxidizing gas channel 133. When viewed as a whole, a part of the oxidizing gas flowing in the first oxidizing gas channel 131 and the second and third oxidizing gas channels 132, 133 flows into the channel 33y of the first oxidizing gas channel 131.

Therefore, a part of the oxidizing gas flowing in the first oxidizing gas channel 131 and the second oxidizing gas channels 132,133 shortcuts into the channel 33y of the first oxidizing gas channel 131, so that it is discharged through the oxidizing gas discharge manifold hole 22 without being used for the reaction. This leads to a drop in the utilization efficiency of the reaction gas.

To cope with this, the fuel cell 100 having the fuel cell separator 11 according to the twelfth embodiment is formed as follows. Of the ribs formed between adjacent pairs of grooves 131 to 133, the portion of the second rib 72, which is defined only by the groove 133 constituting the third oxidizing gas channel 133 and runs along the third downstream linear portion 33m, is made to have a larger width than other ribs (this portion is located between the third downstream linear portion 33m of the second rib 72 and the channel 33y). This makes it possible to reduce the pressure gradient caused by the pressure difference between the oxidizing gas flowing in the channel 33y of the third oxidizing gas channel 133 and the oxidizing gas flowing in the third downstream linear portion 33m of the third oxidizing gas channel 131. In other words, this makes it possible to increase the fluid resistance occurring when the oxidizing gas flows in the cathode gas diffusion layer 3b (more precisely, the portion of the cathode gas diffusion layer 3b that corresponds to the portion of the second rib 72 running along the third downstream linear portion 33m when viewed in a thickness direction of the fuel cell). Thanks to this, the flow rate of oxidizing gas which shortcuts from the channel 33y of the third oxidizing gas channel 133 into the third downstream linear portion 33m of the downstream portion 133c can be reduced.

In addition, since the oxidizing gas which shortcuts from the channel 33y of the third oxidizing gas channel 133 into the third downstream linear portion 33m can be reduced, the pressure difference between the oxidizing gas flowing in the upstream portions of the first oxidizing gas channel 131 and the second oxidizing gas channel 132 and the oxidizing gas flowing in the upstream portion 133a of the third oxidizing gas channel 133 can be reduced, which results in a reduction in the oxidizing gas which shortcuts from the upstream portions of the first oxidizing gas channel 131 and the second oxidizing gas channel 132 into the third downstream linear portion 33m by way of the upstream portion 133a of the third oxidizing gas channel 133.

The part of the oxidizing gas flowing in the first oxidizing gas channel 131 and the second oxidizing gas channels 132, 133, which part is discharged through the oxidizing gas discharge manifold hole 22 without being used for the reaction with the fuel gas, can be reduced, thereby increasing the utilization efficiency of the reaction gas.

According to the fuel cell 100 having the fuel cell separator 11 of the twelfth embodiment, the shortcut of the reaction gas and therefore the amount of reaction gas discharged without contributing to the reaction can be reduced, which leads to an improvement in the utilization efficiency of the reaction gas.

(Thirteenth Embodiment)

Figure 14:
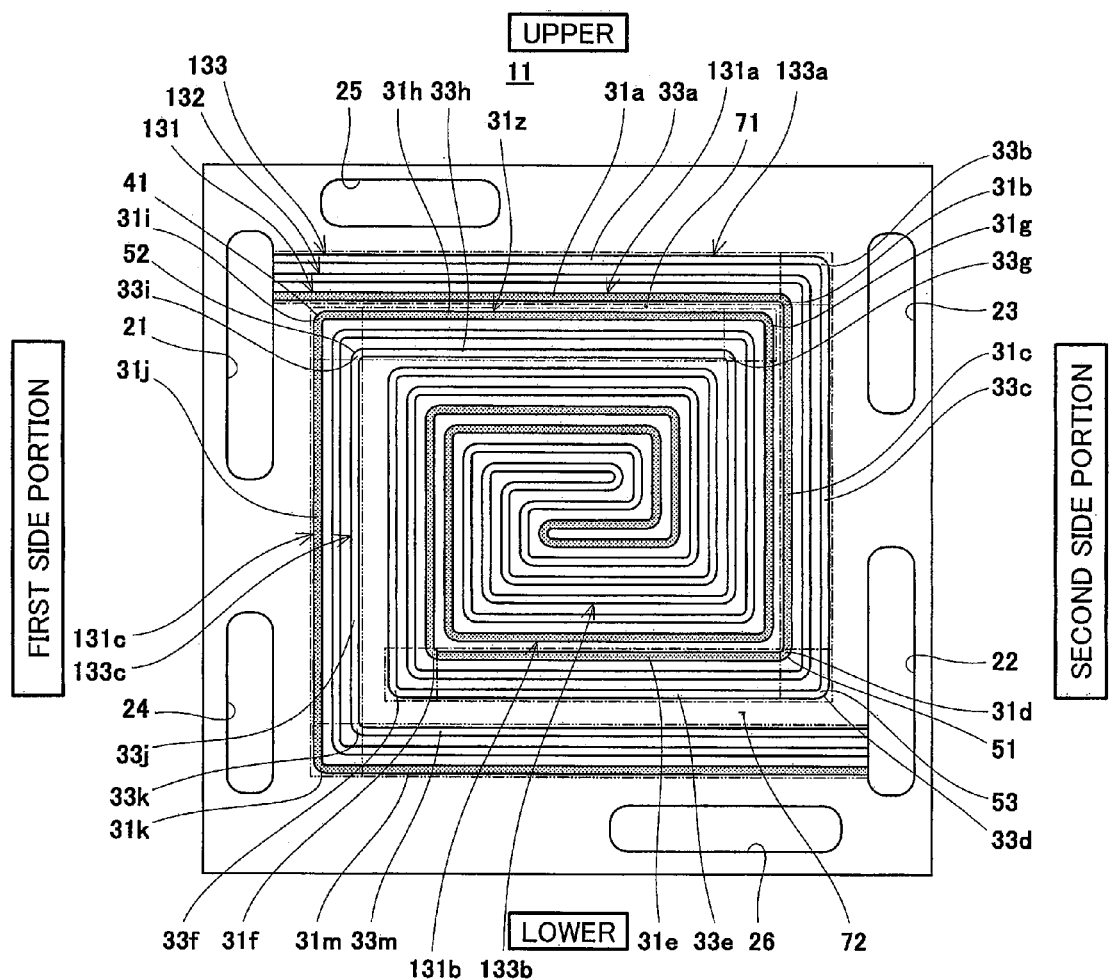
FIG. 14 is a schematic view showing a schematic configuration of a fuel cell separator according to a thirteenth embodiment of the invention.

FIG. 14 is a schematic view showing a schematic configuration of a fuel cell separator according to a thirteenth embodiment of the invention.

As shown in FIG. 14, the fuel cell separator (cathode separator) 11 of the thirteenth embodiment is the same in basic configuration as the fuel cell separator (cathode separator) 11 of the twelfth embodiment except the configuration of the second rib 72. Concretely, the portion of the second rib 72, which extends along the portion located between the third portion 52 and the downstream end of the third oxidizing gas channel 133, has a larger width than other portions of the rib. More specifically, in the fuel cell separator of the thirteenth embodiment of the invention, the third reaction gas channel has the third portion and the fourth portion located on the upstream side of the third portion. The third portion lies closest to the upstream end among portions between the fourth portion and the downstream end of the third reaction gas channel. The fourth portion lies closest to the downstream end among portions between the upstream end and the third portion of the third reaction gas channel. The second rib is formed such that the portion extending along the portion located between the third portion and the downstream end of the third reaction gas channel has a larger width than other portions of the rib.

The fuel cell 100 having the fuel cell separator 11 thus configured according to the thirteenth embodiment has the same operational effect as of the fuel cell 100 having the fuel cell separator 11 of the twelfth embodiment.

(Fourteenth Embodiment)

Figure 15:
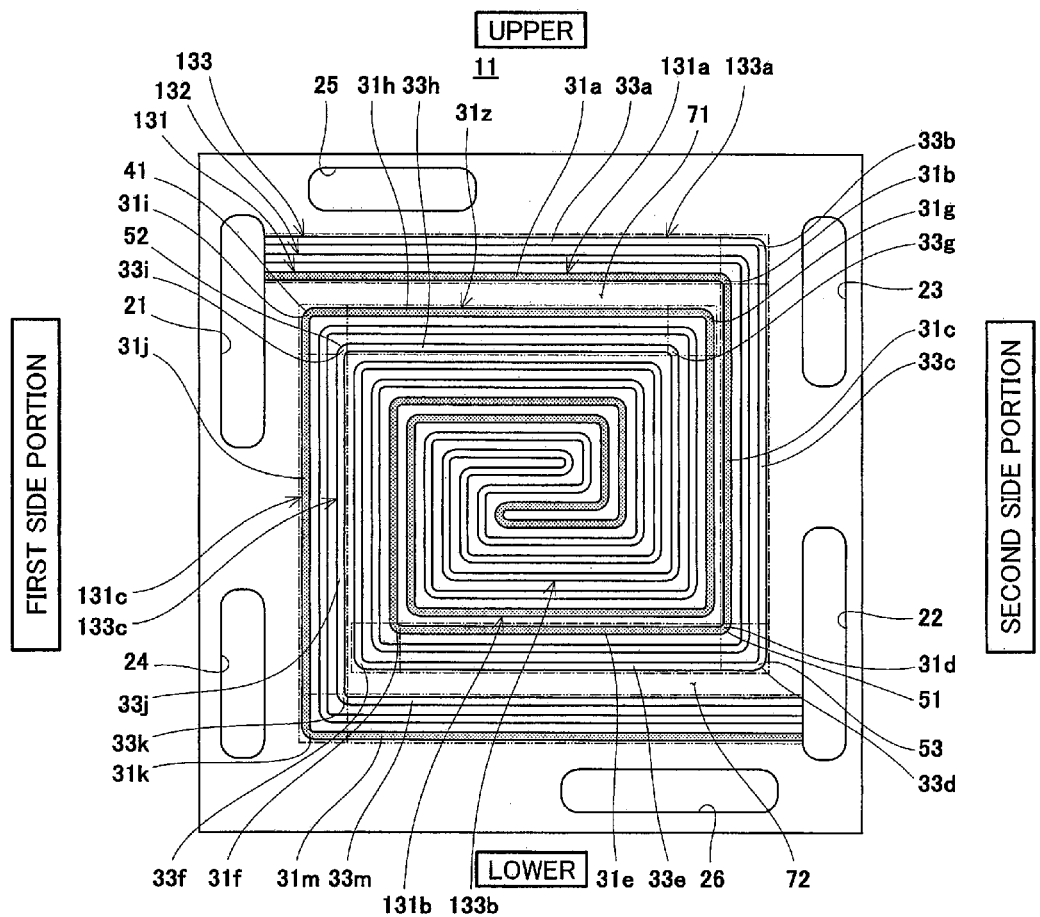
FIG. 15 is a schematic view showing a schematic configuration of a fuel cell separator according to a fourteenth embodiment of the invention.

FIG. 15 is a schematic view showing a schematic configuration of a fuel cell separator according to a fourteenth embodiment of the invention.

In the fuel cell separator according to the fourteenth embodiment of the invention, the specific rib is composed of the first rib defined only by the groove that constitutes the first reaction gas channel and the second rib defined only by the groove that constitutes the third reaction gas channel.

As shown in FIG. 15, the fuel cell separator (cathode separator) 11 of the fourteenth embodiment is the same in basic configuration as the fuel cell separator (cathode separator) 11 of the tenth embodiment except the following point. In addition to the first rib 71, the second rib 72 is formed such that the portion of the second rib 72 that runs along the third downstream linear portion 33m of the third oxidizing gas channel 133 has a larger width than other ribs (excluding the portion of the first rib 71 that runs along the first upstream linear portion 31a), similarly to the fuel cell separator 11 of the twelfth embodiment. That is, the first rib 71 and the second rib 72 constitute the specific rib in this embodiment.

Since the fuel cell 100 having the fuel cell separator 11 thus configured according to the fourteenth embodiment has not only the same operational effect as of the fuel cell 100 of the tenth embodiment but also the same operational effect as of the fuel cell 100 having the fuel cell separator 11 of the twelfth embodiment, the shortcut of the reaction gas and therefore the amount of reaction gas discharged without contributing to the reaction can be further reduced, which leads to a further improvement in the utilization efficiency of the reaction gas.

(Fifteenth Embodiment)

Figure 16:
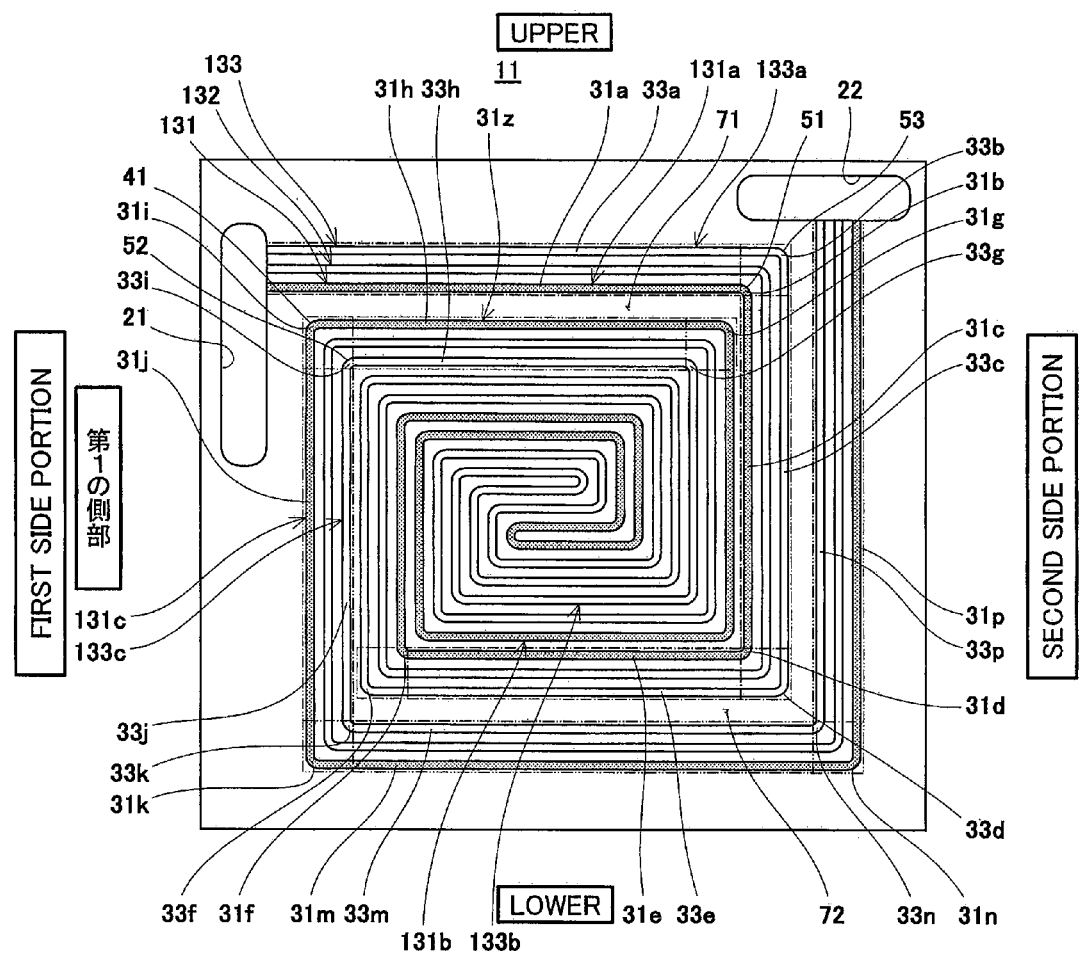
FIG. 16 is a schematic view showing a schematic configuration of a fuel cell separator according to a fifteenth embodiment of the invention.

FIG. 16 is a schematic view showing a schematic configuration of a fuel cell separator according to a fifteenth embodiment of the invention. In FIG. 16, only the oxidizing gas supply manifold hole 21 and the oxidizing gas discharge manifold hole 22 are shown and other manifold holes are omitted.

As shown in FIG. 16, the fuel cell separator (cathode separator) 11 of the fifteenth embodiment is the same in basic configuration as the fuel cell separator (cathode separator) 11 of the fourteenth embodiment except the position of the oxidizing gas discharge manifold hole 22, the configurations of the downstream portions of the first, second and third oxidizing gas channels 131, 132, 133 and the configuration of the second rib 72.

Concretely, the oxidizing gas discharge manifold hole 22 is provided in the upper part of the second side portion. The downstream portions 131c, 133c of the first and third oxidizing gas channels 131, 133 are each composed of the first downstream turn portion 31g (33g), the first downstream linear portion 31h (33h), the second downstream turn portion 31i (33i), the second downstream linear portion 31j (33j), the third downstream turn portion 31k (33k), the third downstream linear portion 31m (33m), a fourth downstream turn portion 31n (33n), and a fourth downstream linear portion 31p (33p). The downstream portions 131c, 133c of the first and third oxidizing gas channels 131, 133 are formed similarly to the downstream portions 131c, 133c of the first and third oxidizing gas channels 131, 133 of the cathode separator 11 according to the fourteenth embodiment, in terms of the portions extending from their respective upstream ends to the third downstream linear portions 31m, 33m respectively. In each of the downstream portions 131c, 133c of the first and third oxidizing gas channels 131, 133, the downstream end of the third downstream linear portion 31m (33m) is connected to the upstream end of the fourth downstream turn portion 31n (33n) configured to be bent to change the flow of channel from the horizontal direction to the vertical direction. The downstream end of the fourth downstream turn portion 31n (33n) is connected to the upstream end of the fourth downstream linear portion 31p (33p) configured to vertically extend in the upward direction. The downstream portion of the fourth downstream linear portion Sip (33p) is communicated with the oxidizing gas discharge manifold hole 22.

In addition, the portion of the second rib 72 that runs along the third downstream linear portion 33m, the fourth downstream turn portion 33n and the fourth downstream linear portion 33p has a larger width than other ribs (excluding the portion of the first rib 71 that runs along the first upstream linear portion 31a).

The second oxidizing gas channel 132 is configured similarly to the first and third oxidizing gas channels 131, 133 and therefore a detailed description thereof is omitted. In addition, since the downstream portion 131c of the first oxidizing gas channel 131 is configured as described above, the second portion 51, which lies closest to the downstream end of the first oxidizing gas channel 131 among portions between the upstream end of the first oxidizing gas channel 131 and the first portion 41, is the first upstream turn portion 31b of the upstream portion 131a. Since the downstream portion 133c of the third oxidizing gas channel 133 is configured as described above, the fourth portion 53 is the downstream end of the horizontally extending portion of the first upstream turn portion 33b.

The fuel cell 100 having the fuel cell separator 11 thus configured according to the fifteenth embodiment has the same operational effect as of the fuel cell 100 having the fuel cell separator 11 of the fourteenth embodiment.

(Sixteenth Embodiment)

Figure 17:
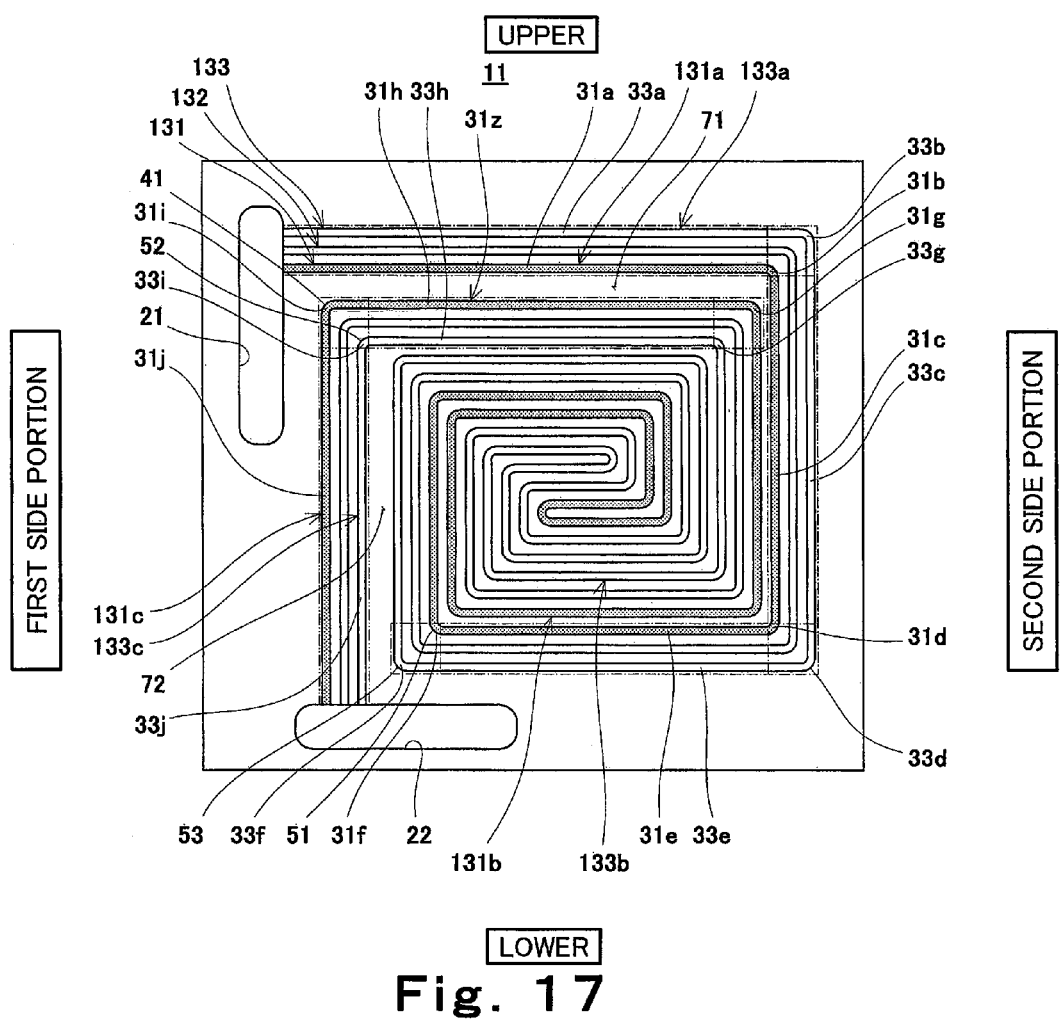
FIG. 17 is a schematic view showing a schematic configuration of a fuel cell separator according to a sixteenth embodiment of the invention.

FIG. 17 is a schematic view showing a schematic configuration of a fuel cell separator according to a sixteenth embodiment of the invention. In FIG. 17, only the oxidizing gas supply manifold hole 21 and the oxidizing gas discharge manifold hole 22 are shown and other manifold holes are omitted.

As shown in FIG. 17, the fuel cell separator (cathode separator) 11 of the sixteenth embodiment is the same in basic configuration as the fuel cell separator (cathode separator) 11 of the fourteenth embodiment except the position of the oxidizing gas discharge manifold hole 22, the configurations of the downstream portions of the first oxidizing gas channel 131 and the third oxidizing gas channel 132, 133 and the configuration of the second rib 72.

Concretely, the oxidizing gas discharge manifold hole 22 is provided in the lower part of the first side portion. The downstream portions 131c, 133c of the first and third oxidizing gas channels 131, 133 are formed into a substantially L-shape and each composed of the first downstream turn portion 31g (33g), the first downstream linear portion 31h (33h), the second downstream turn portion 31i (33i) and the second downstream linear portion 31j (33j). Further, the portion of the second rib 72 that runs along the second downstream linear portion 33j has a larger width than other ribs (excluding the portion of the first rib 71 that runs along the first upstream linear portion 31a).

The second oxidizing gas channel 132 is configured similarly to the first and third oxidizing gas channels 131, 133 and therefore a detailed description thereof is omitted. In addition, since the downstream portion 131c of the first oxidizing gas channel 131 is configured as described above, the second portion 51, which lies closest to the downstream end of the first oxidizing gas channel 131 among portions between the upstream end of the first oxidizing gas channel 131 and the first portion 41, is the third upstream turn portion 31f of the upstream portion 131a. Since the downstream portion 133c of the third oxidizing gas channel 133 is configured as described above, the fourth portion 53 is the downstream end of the horizontally extending portion of the third upstream turn portion 33f.

The fuel cell 100 having the fuel cell separator 11 thus configured according to the sixteenth embodiment has the same operational effect as of the fuel cell 100 having the fuel cell separator 11 of the fourteenth embodiment.

(Seventeenth Embodiment)

Figure 18:
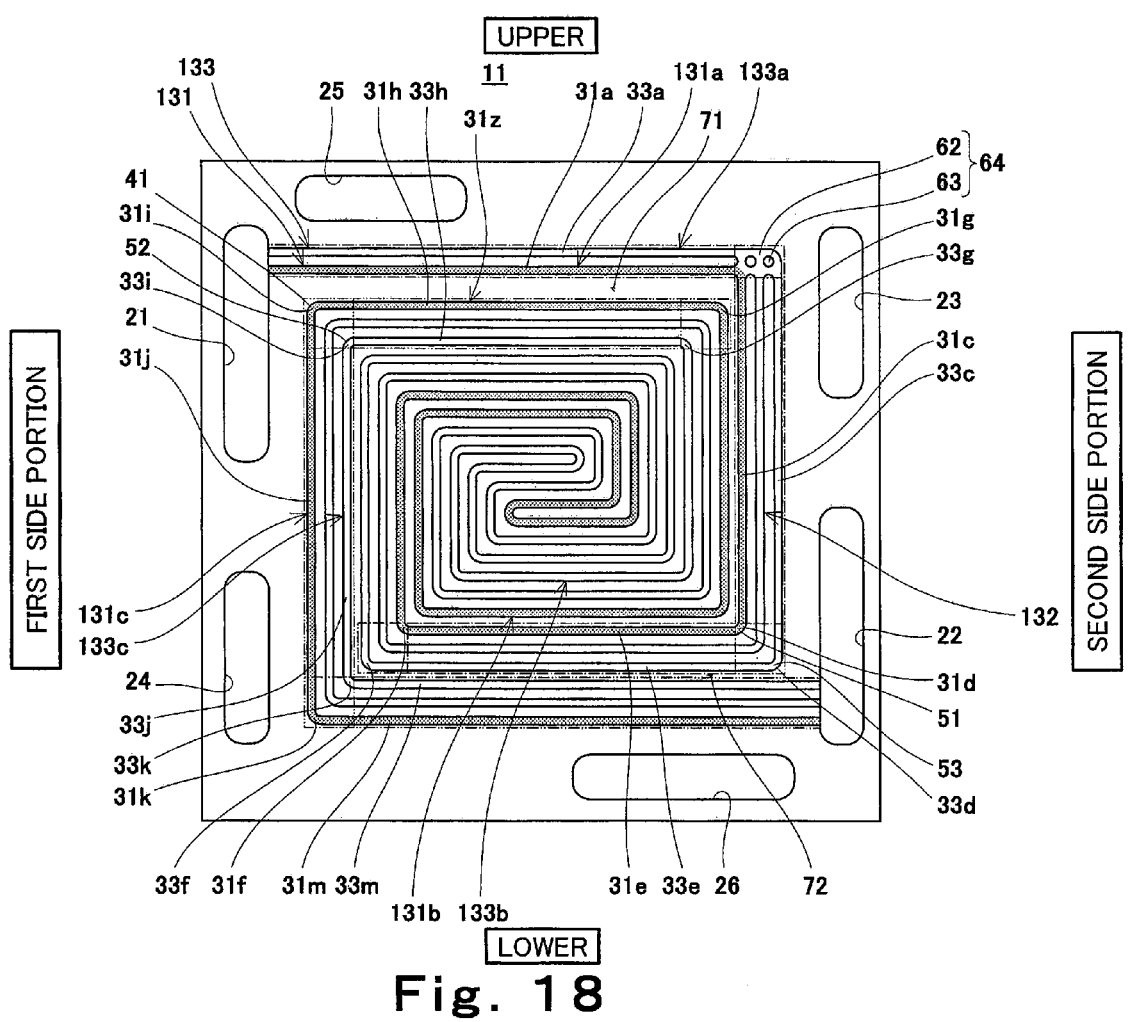
FIG. 18 is a schematic view showing a schematic configuration of a fuel cell separator according to a seventeenth embodiment of the invention.

FIG. 18 is a schematic view showing a schematic configuration of a fuel cell separator according to a seventeenth embodiment of the invention.

In the fuel cell separator according to the seventeenth embodiment of the invention, a first reaction gas mixing portion is formed between the upstream end and the second portion of the first reaction gas channel, the mixing portion being constituted by a recess having, at its bottom surface, a plurality of standing projections. The first reaction gas mixing portion allows the reaction gas that flows in the first reaction gas channel on the upstream side of the first reaction gas mixing portion and the reaction gas that flows in at least one of the plurality of reaction gas channels other than the first reaction gas channel to join together. The first reaction gas mixing portion distributes the reaction gas after joining into the first reaction gas channel on the downstream side of the first reaction gas mixing portion and into at least one of the plurality of reaction gas channels other than the first reaction gas channel. The number of reaction gas channels provided on the upstream side of the first reaction gas mixing portion is smaller than the number of reaction gas channels provided on the downstream side of the first reaction gas mixing portion.

As shown in FIG. 18, the fuel cell separator (cathode separator) 11 of the seventeenth embodiment of the invention is the same in basic configuration as the fuel cell separator (cathode separator) 11 of the tenth embodiment except the provision of the first reaction gas mixing portion 64 in the middle of the upstream portions 131a, 133a of the first and third oxidizing gas channels 131, 133 and the position of the upstream end of the second oxidizing gas channel 132.

Concretely, the first reaction gas mixing portion 64 is provided between the upstream end and the second portion 51 of the first oxidizing gas channel 131. Herein, it is provided in the portion where the downstream end of the first upstream linear portion 31a is connected to the upstream end of the second upstream linear portion 31c (the portion corresponding to the first upstream turn portion 31b of the tenth embodiment). The first oxidizing gas mixing portion 64 is composed of the recess 62 and the plurality of projections 63 that stand on the bottom surface of the recess 62.

The recess 62 is formed into a substantially rectangular shape when viewed in a thickness direction of the cathode separator 11. The recess 62 is communicated, at its upstream end, with the first upstream linear portions 31a, 33a of the first and third oxidizing gas channels 131, 133 and communicated, at its downstream end, with the second upstream linear portions 31c, 33c of the first and third oxidizing gas channels 131, 133 and the second oxidizing gas channel 132. That is, the upstream end of the oxidizing gas channel 132 is the recess 62.

The recess 62 has the same depth as of the first, second and third oxidizing gas channels 131, 132, 133, and its bottom surface is provided with the multiplicity of island-like projections 63 (substantially cylindrical (more precisely, substantially perfect cylindrical) projections in this embodiment) that project from the bottom surface in the thickness direction. The projections 63 (two projections 63 in this embodiment) are formed at a uniform pitch. Although the projections 63 are formed into a substantially cylindrical shape in this embodiment, the shape of the projections 63 is not limited to this but substantially cylindrical shapes, substantially triangular prism shapes and substantially quadrangular prism shapes may be employed. Although the section of the projections 63 when cut perpendicularly to the standing direction of the projections 63 has a substantially perfect circular shape in this embodiment, the shape of the cross-section is not necessarily limited to this but elliptical shape may be employed.

This enables the oxidizing gases which have flowed through the first upstream linear portions 31a, 33a of the first and third oxidizing gas channels 131, 133 to join together in the recess 62 of the first reaction gas mixing portion 64. The flow of oxidizing gases, which have joined together in the recess 62, is disturbed by the plurality of projections 63 arranged in a stripe shape on the recess 62 so that mixing of the oxidizing gases is accelerated. The mixed oxidizing gas then branches in its flow at the downstream end of the recess 62 and flows into the first, second and third oxidizing gas channel 131, 132, 133.

The fuel cell 100 having the fuel cell separator 11 thus configured according to the seventeenth embodiment has the same operational effect as of the fuel cell 100 having the fuel cell separator 11 of the tenth embodiment.

Although the first reaction gas mixing portion 64 is provided in the portion where the downstream end of the first upstream linear portion 31a is connected to the upstream end of the second upstream linear portion 31b in the seventeenth embodiment, the position of the first reaction gas mixing portion 64 is not necessarily limited to this but may be anywhere between the upstream end of the first oxidizing gas channel 131 and the second portion 51. Although the first reaction gas mixing portion 64 is constituted by the recess 62 and the projections 63 in this embodiment, the mixing portion 64 is not necessarily limited to this but may be constituted by a communication channel for establishing fluid communication between the channels.

(Eighteenth Embodiment)

Figure 19:
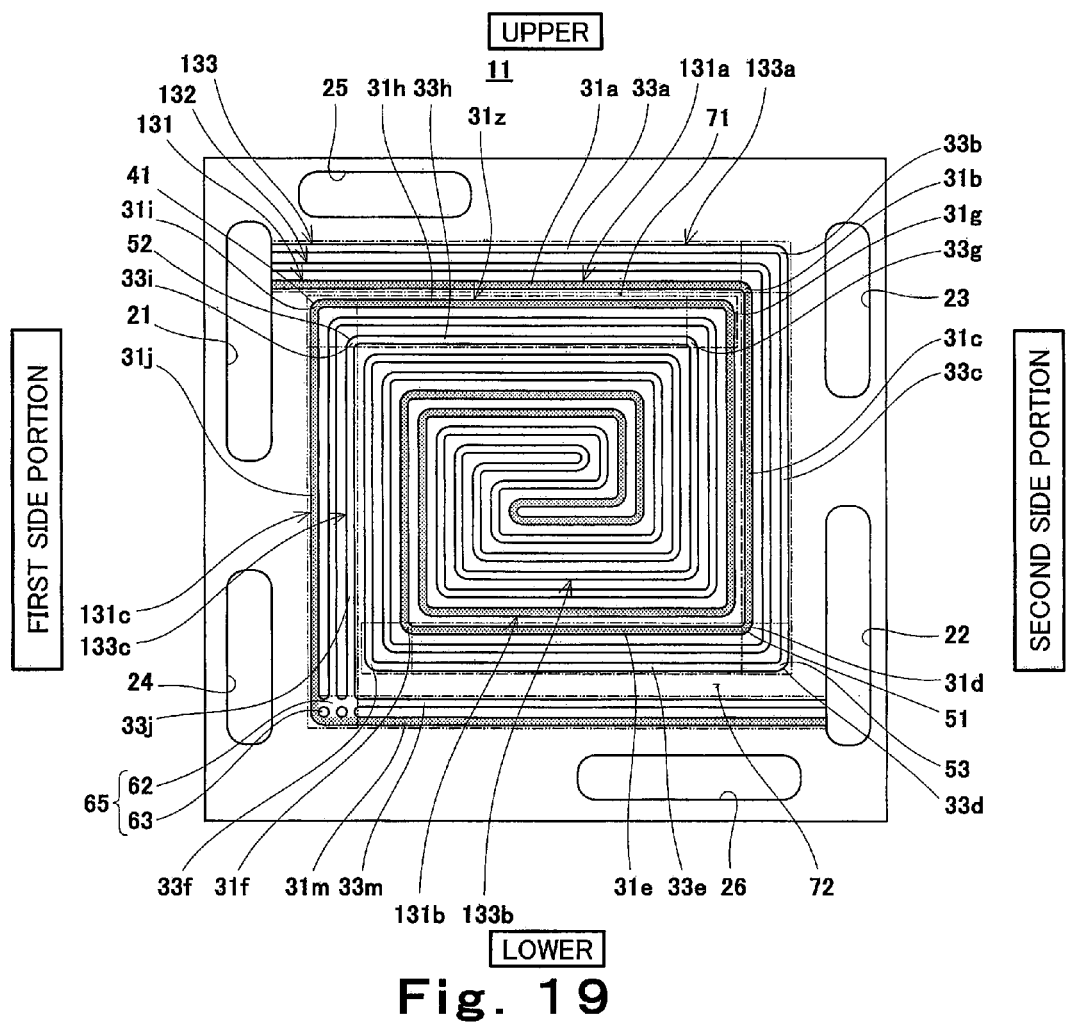
FIG. 19 is a schematic view showing a schematic configuration of a fuel cell separator according to an eighteenth embodiment of the invention.

FIG. 19 is a schematic view showing a schematic configuration of a fuel cell separator according to an eighteenth embodiment of the invention.

In the fuel cell separator according to the eighteenth embodiment of the invention, a second reaction gas mixing portion composed of a recess having a plurality of projections formed at the bottom surface thereof is formed between the third portion and the downstream end of the third reaction gas channel. The second reaction gas mixing portion causes the reaction gas flowing in the third reaction gas channel on the upstream side of the second reaction gas mixing portion and the reaction gas flowing in at least one of the plurality of reaction gas channels other than the third reaction gas channel to join together and distributes the reaction gas after joining into the third reaction gas channel on the downstream side of the second reaction gas mixing portion and into at least one of the plurality of reaction gas channels other than the first reaction gas channel. The number of reaction gas channels provided on the upstream side of the second reaction gas mixing portion is larger than the number of reaction gas channels provided on the downstream side of the second reaction gas mixing portion.

As shown in FIG. 19, the fuel cell separator (cathode separator) 11 of the eighteenth embodiment is the same in basic configuration as the fuel cell separator of the twelfth embodiment except the provision of a second reaction gas mixing portion 65 in the middle of the downstream portions 131c, 133c of the first and third oxidizing gas channels 131, 133 and the position of the downstream end of the second oxidizing gas channel 132.

Concretely, the second reaction gas mixing portion 65 is provided between the third portion 52 and the downstream end of the third oxidizing gas channel 133. Herein, the second reaction gas mixing portion 65 is provided in the portion where the downstream end of the second downstream linear portion 33j is connected to the upstream end of the third downstream linear portion 33m (the portion corresponding to the third upstream turn portion 33k of the twelfth embodiment) and the downstream end of the second oxidizing gas channel 132 is located. The second reaction gas mixing portion 65 is constituted, similarly to the first reaction gas mixing portion 64, by the recess 62 and the plurality of projections 63 provided so as to stand on the bottom surface of the recess 62.

The recess 62 is formed in a substantially rectangular shape when viewed in a thickness direction of the cathode separator 11. The recess 62 is communicated, at its upstream end, with the second downstream linear portions 31j, 33j of the first and third oxidizing gas channels 131, 133 and communicated, at its downstream end, with the third downstream linear portions 31m, 33m of the first and third oxidizing gas channels 131, 133. In addition, the recess 62 is communicated with the downstream end of the oxidizing gas channel 132.

The recess 62 has the same depth as of the first oxidizing gas channel 131 and the second oxidizing gas channels 132, 133, and its bottom surface is provided with the multiplicity of island-like projections 63 (substantially cylindrical (more precisely, substantially perfect cylindrical) projections in this embodiment) that project from the bottom surface in the thickness direction. The projections 63 (two projections 63 in this embodiment) are formed at a uniform pitch. Although the projections 63 are formed into a substantially cylindrical shape in this embodiment, the shape of the projections 63 is not limited to this but substantially cylindrical shapes, substantially triangular prism shapes and substantially quadrangular prism shapes may be employed. Although the section of the projections 63 when cut perpendicularly to the standing direction of the projections 63 has a substantially perfect circular shape, the shape of the cross-section is not necessarily limited to this but elliptical shape may be employed.

This causes the oxidizing gas flowing in the second downstream linear portions 31j, 33j of the first and third oxidizing gas channels 131, 133 and the oxidizing gas flowing in the downstream portion of the second oxidizing gas channel 132 to join together in the recess 62 of the second reaction gas mixing portion 65. The flow of oxidizing gases, which have joined together in the recess 62, is disturbed by the plurality of projections 63 arranged in a stripe shape on the recess 62 so that mixing of the oxidizing gases is accelerated. The mixed oxidizing gas then branches in its flow at the downstream end of the recess 62 and flows into the first oxidizing gas channel 131 and the third oxidizing gas channel 133.

The fuel cell having the fuel cell separator 11 thus constructed according to the eighteenth embodiment has the same operational effect as of the fuel cell having the fuel cell separator 11 of the twelfth embodiment.

Although the second reaction gas mixing portion 65 is provided in the portion where the downstream end of the second downstream linear portion 33j is connected to the upstream end of the third downstream linear portion 33m, the position of the second reaction gas mixing portion 65 is not necessarily limited to this but may be anywhere between the third portion 52 and the downstream end of the third oxidizing gas channel 133. Although the second reaction gas mixing portion 65 is constituted by the recess 62 and the projections 63 in the eighteenth embodiment, the mixing portion 65 is not limited to this but may be constituted by a communication channel for establishing fluid communication between the channels.

(Nineteenth Embodiment)

Figure 20:
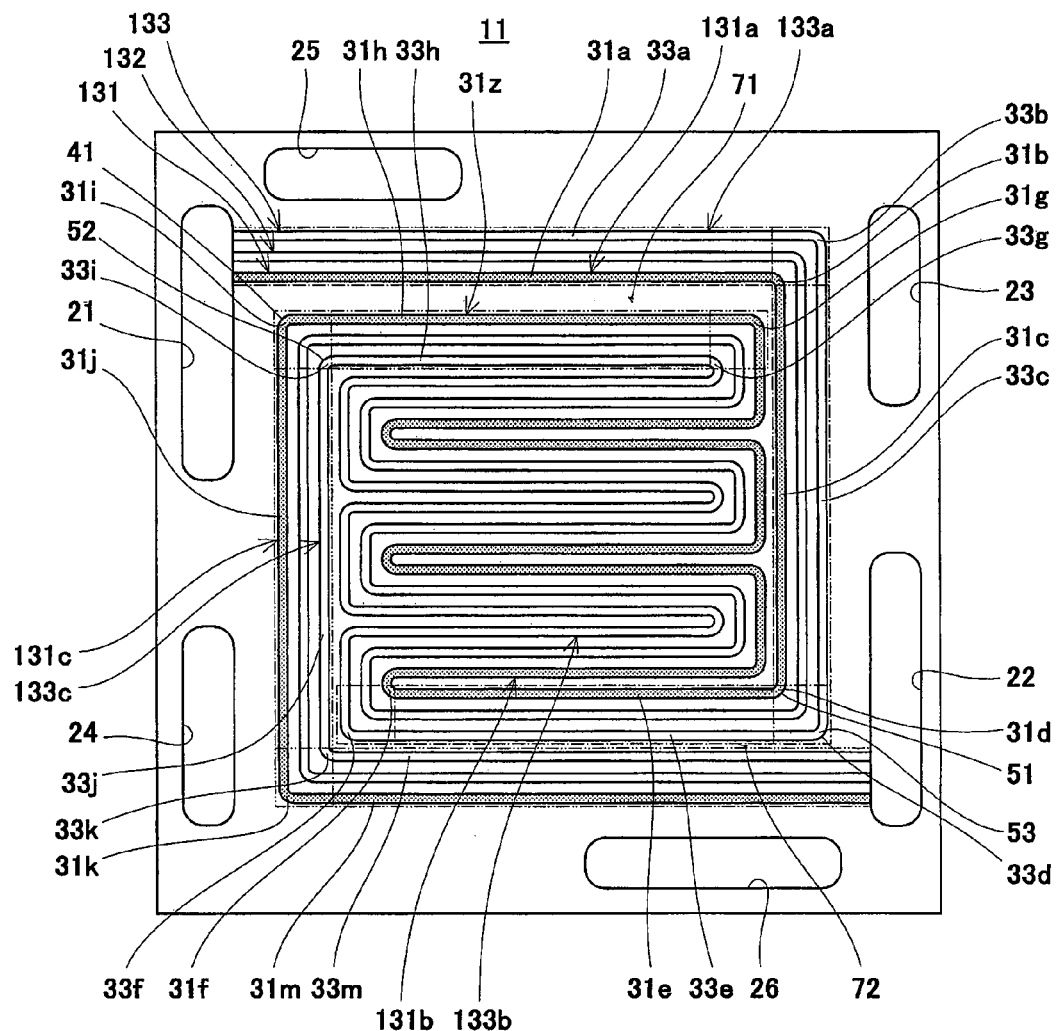
FIG. 20 is a schematic view showing a schematic configuration of a fuel cell separator according to a nineteenth embodiment of the invention.

FIG. 20 is a schematic view showing a schematic configuration of a fuel cell separator according to a nineteenth embodiment of the invention.

As shown in FIG. 20, the fuel cell separator (cathode separator) 11 of the nineteenth embodiment is the same in basic configuration as the fuel cell separator (cathode separator) 11 of the tenth embodiment except that, in the nineteenth embodiment, the midstream portions of the first and third oxidizing gas channels 131, 133 and the second oxidizing gas channel 132 are formed in a serpentine shape. The configuration of the midstream portion 131b of the first oxidizing gas channel 131 will be described below.

The midstream portion 131b of the first oxidizing gas channel 131 horizontally extends a certain distance in the first lateral direction from the downstream end of the upstream portion 131a and then extends in the upward direction and turns, thereby making a 180 degree turn. Thereafter, the midstream portion 131b horizontally extends a certain distance in the second lateral direction and then vertically extends a certain distance in the upward direction. After repeating this extending shape twice and horizontally extending a certain distance in the first lateral direction, the midstream portion 131b reaches the upstream end of the downstream portion 131c.

The fuel cell 100 having the fuel cell separator 11 thus constructed according to the nineteenth embodiment has the same operational effect as of the fuel cell 100 of the tenth embodiment.

(Twentieth Embodiment)

Figure 21:
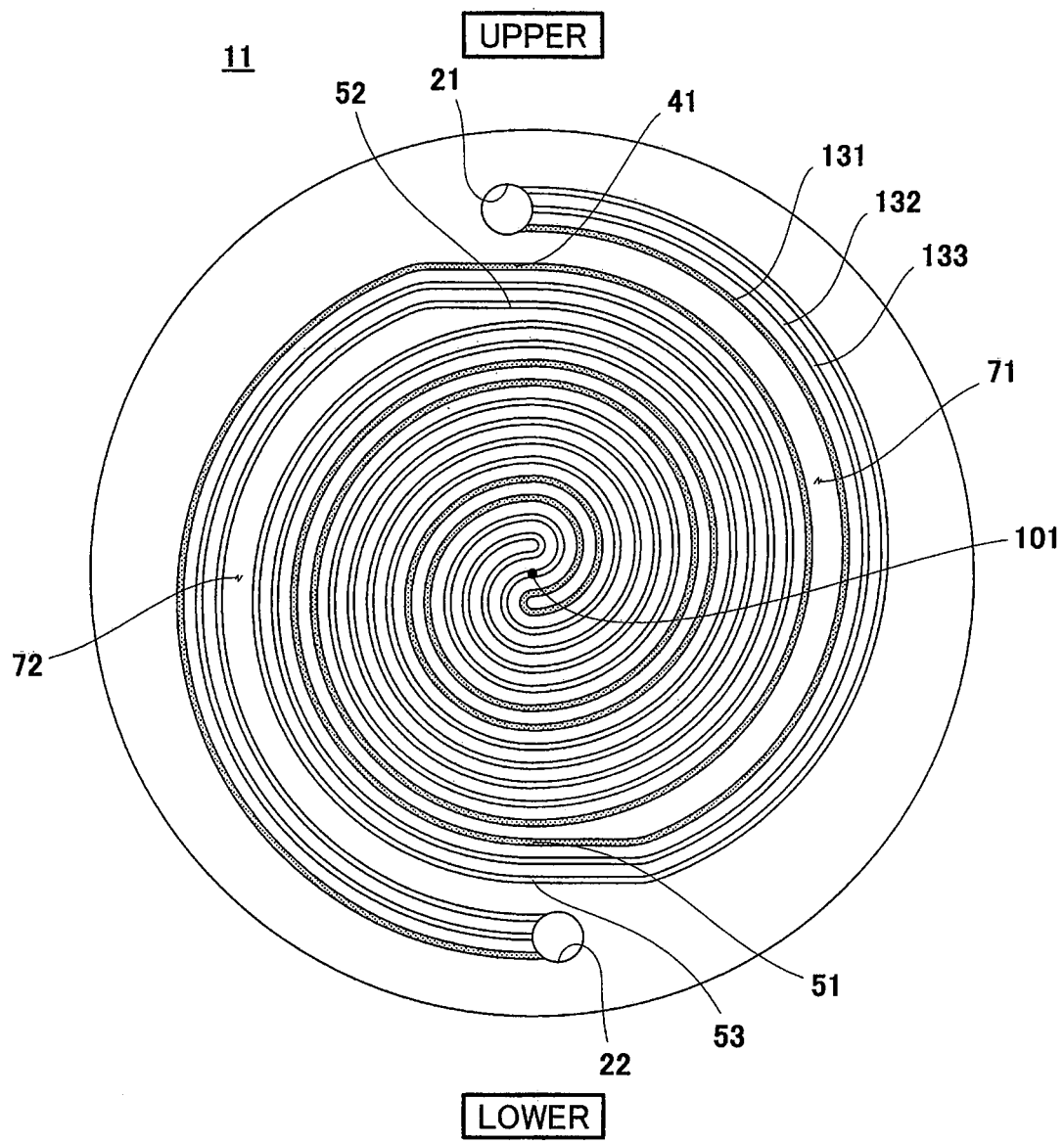
FIG. 21 is a schematic view showing a schematic configuration of a fuel cell separator according to a twentieth embodiment of the invention.

FIG. 21 is a schematic view showing a schematic configuration of a fuel cell separator according to a twentieth embodiment of the invention. In FIG. 21, only the oxidizing gas supply manifold hole 21 and the oxidizing gas discharge manifold hole 22 are shown and other manifold holes are omitted.

As illustrated in FIG. 21, the fuel cell separator (cathode separator) 11 of the twentieth embodiment is formed in a disk shape and its principal surface is provided with the first oxidizing gas channel 131 and the oxidizing gas channels 132, 133 which run along one another. The oxidizing gas supply manifold hole 21 and the oxidizing gas discharge manifold hole 22 are opposed to each other with the central portion (i.e., the central axis 101) of the cathode separator 11 being located therebetween. Although the oxidizing gas supply manifold hole 21 and the oxidizing gas discharge manifold hole 22 are opposed to each other with the central axis of the cathode separator 11 being located therebetween in this embodiment, the positions of these manifold holes are not limited to this but may be anywhere in the peripheral portion of the cathode separator 11.

The first to third oxidizing gas channels 131, 132, 133 are formed in a spiral shape when viewed as a whole. More concretely, they are formed to extend clockwise so as to draw an arc from their upstream ends toward the central portion of the cathode separator in a convergent fashion and then turn back at the central portion of the cathode separator 11 to extend counterclockwise so as to draw an arc toward the peripheral portion of the cathode separator 11 in a divergent fashion.

The first oxidizing gas channel 131 has the first portion 41 and the second portion 51. As discussed earlier, the first portion lies closest to the upstream end of the first oxidizing gas channel 131 among portions located between the second portion 51 and the downstream end of the first oxidizing gas channel 131. In this embodiment, the first portion 41 is constituted by the portion closest to the outer periphery of the separator 11 among portions that intersect the line connecting the upstream end of the first oxidizing gas channel 131 and the central axis 101. The second portion 51 lies closest to the downstream end of the first oxidizing gas channel 131 among portions located between the upstream end and the first portion 41 of the first oxidizing gas channel 131. In this embodiment, the second portion 51 is constituted by the portion closest to the outer periphery of the separator 11 among portions that intersect the line connecting the downstream end of the first oxidizing gas channel 131 and the central axis 101.

Further, the third oxidizing gas channel 133 has the third portion 52 and the fourth portion 53. As discussed earlier, the third portion 52 is the portion of the third oxidizing gas channel 133 that corresponds to the first portion 41 of the first oxidizing gas channel 131. The third portion 52 lies closest to the upstream end of the third oxidizing gas channel 133 among portions between the fourth portion 53 and the downstream end. Herein, the portion of the third oxidizing gas channel 133, which lies closest to the outer periphery of the separator 11 among portions that intersect the line connecting the upstream end of the third oxidizing gas channel 133 and the central axis 101, constitutes the third portion 52. The fourth portion 53 is the portion of the third oxidizing gas channel 133 that corresponds to the second portion 51 of the first oxidizing gas channel 131 and lies closest to the downstream end of the third oxidizing gas channel 133 among portions located between the upstream end of the third oxidizing gas channel 133 and the third portion 52. Herein, the portion of the third oxidizing gas channel 133, which lies closest to the outer periphery of the separator 11 among portions that intersect the line connecting the downstream end of the third oxidizing gas channel 133 and the central axis 101, constitutes the fourth portion 53.

The rib, defined only by the groove 131 that constitutes the first oxidizing gas channel 131, constitutes the first rib 71. The rib, defined only by the groove 133 that constitutes the third oxidizing gas channel 133, constitutes the second rib 72. In this embodiment, the portion of the first rib 71 that runs along the portion between the upstream end and the second portion 51 of the first oxidizing gas channel 131 and the portion of the second rib that runs along the portion between the third portion 52 and the downstream end of the third oxidizing gas channel 133 has a larger width than other ribs than these portions.

The fuel cell 100 having the fuel cell separator 11 thus constructed according to the twentieth embodiment exerts the same operational effect as of the fuel cell 100 having the fuel cell separator of the fourteenth embodiment.

Although the invention has been described in detail according to its preferred embodiments, the invention is not necessarily limited to the particular embodiments shown herein.

Although the portion of the first rib 71 extending from the upstream end to the first portion and/or the portion of the second rib 72 extending from the third portion to the downstream end has a larger width than other portions of the ribs than these portions, the invention is not necessarily limited to this and is equally applicable to cases where the portion of the first rib 71 extending from the upstream end to the downstream end and/or the portion of the second rib 72 extending from the upstream end to the downstream end has a larger width than other ribs. Although other ribs than the portion of the first rib 71 extending from the upstream end to the first portion and/or the portion of the second rib 72 extending from the third portion to the downstream end are formed so as to have the substantially same width, the invention is not limited to this but equally applicable to cases where these ribs have different widths. Further, a part of other ribs than the first and second ribs 71, 72 and the portion of the first rib 71 extending from the upstream end to the first portion and/or the portion of the second rib 72 extending from the third portion to the downstream end may have a larger width than other portions than these portions as long as the operational effect of the invention can be obtained.

Although the oxidizing gas supply manifold hole 21 and the oxidizing gas discharge manifold hole 22 are opposed to each other with the central axis of the cathode separator 11 being located therebetween in this embodiment, the positions of these manifold holes are not necessarily limited to this, but may be anywhere in the peripheral portion of the cathode separator 11.

Next, there will be explained the result of a simulation analysis that has been conducted to verify the effect of the fuel cell 100 of the invention.

Test Example 1

Figure 22:
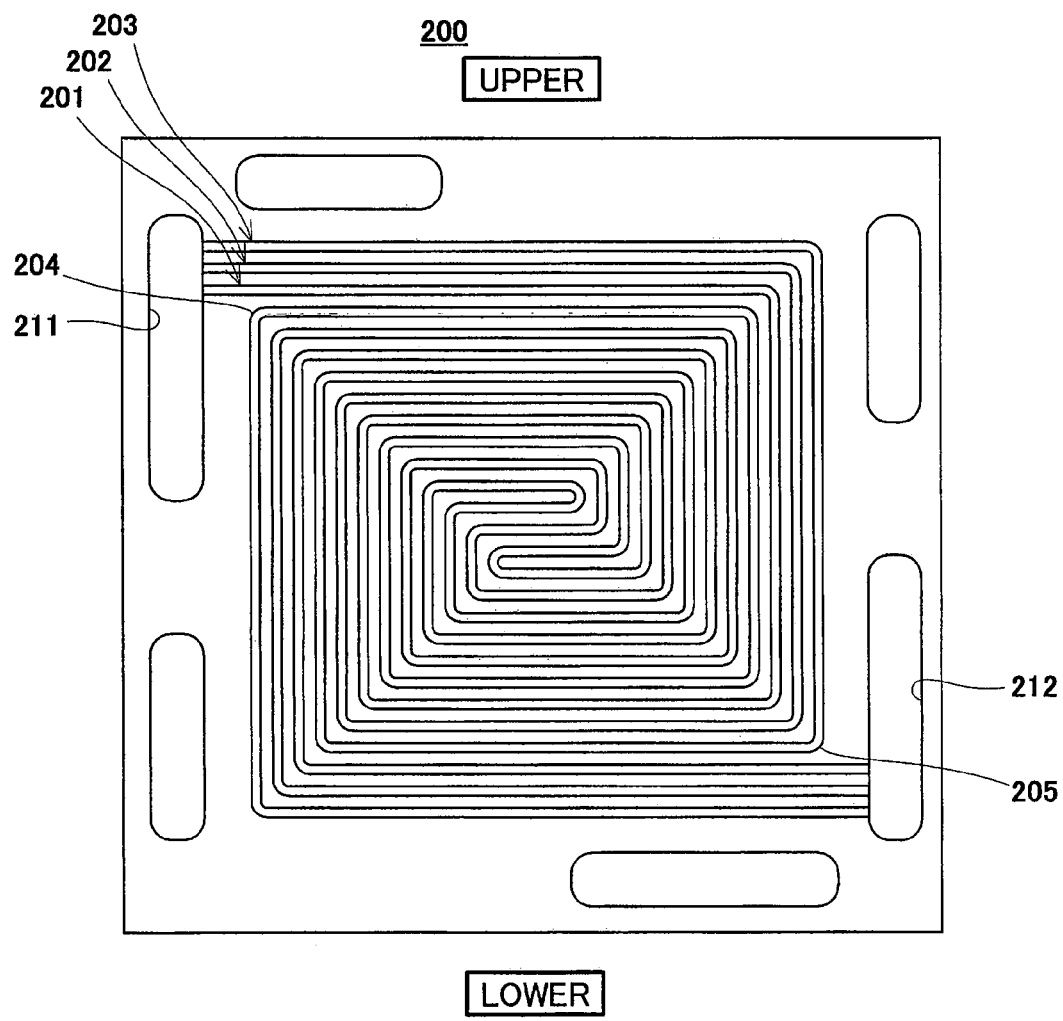
FIG. 22 is a schematic view showing a schematic configuration of a principal surface of a separator provided in a fuel cell disclosed in Patent Document 1.

To verify the effect of the fuel cell of the invention, a simulation analysis was conducted in which the fuel cell 100 having the fuel cell separator 11 according to the first embodiment of the invention was represented by Example 1 and the fuel cell 100 having the separator 200 shown in FIG. 22 was represented by Comparative Example 1. For simple evaluation, only the electrode surfaces are analyzed as the analysis object.

In the analysis, FLUENT, PEM MODULE produced by ANSYS Japan K.K. was used. Power generation conditions were as follows: current density=0.24 A/cm$^2$; fuel utilization efficiency=75%; oxygen utilization efficiency=55%; mixed gas containing 75% hydrogen and 25% carbon dioxide was used as the fuel gas; air was used as the oxidizing gas; the dew point of the fuel gas=65 deg C.; the dew point of the oxidizing gas=35 deg C.; and cell temperature=90 deg C.

As a result, it was found that proton conductivity which varied depending on the moisture content of the polymer electrolyte membrane 1 was 0.816 S/m in Example 1 and 0.771 S/m in Comparative Example 1. This proved that proton conductivity that affected the cell performance could be improved by the configuration of the invention.

The inventors of the present application think that the above result is attributable to the following fact. If the fuel cell 100 is operated at low humidification levels, the polymer electrolyte membrane 1 will be dried causing a decrease in proton conductivity. Especially, if power generation is intensively performed in a certain part (the downstream portion of the first oxidizing gas channel in this example) of the cell (the principal surface of the separator), the polymer electrolyte membrane 1 corresponding to this part will be more dried due to heat generation entailed by the power generation, which will result in a further decrease in proton conductivity. In the fuel cell 10 having the fuel cell separator 11 of the first embodiment, however, the oxidizing gas is distributed to the first oxidizing gas channel 131 and the second oxidizing gas channels 132, 133. With this, the concentration of power generation is mitigated, so that the moisture content of the polymer electrolyte membrane 10 increases, resulting in an improvement in the proton conductivity.

Next, the result of a power generation experiment conducted on the fuel cell 100 of the invention will be discussed.

Test Example 2

The electromotive forces (voltage) of the fuel cells 100 were measured, and in this measurement, the fuel cell (cell) 100 having the fuel cell separator 11 according to the fourth embodiment of the invention was represented by Example 2 and the fuel cell 100 having the separator 200 shown in FIG. 22 was represented by Comparative Example 1. Power generation conditions were as follows: current density=0.16 A/cm$^2$; fuel utilization efficiency=75%; oxygen utilization efficiency=85%; mixed gas containing 75% hydrogen and 25% carbon dioxide was used as the fuel gas; air was used as the oxidizing gas; the dew point of the fuel gas=65 deg C.; the dew point of the oxidizing gas=35 deg C.; and cell temperature=90 deg C.

The result was such that a voltage of 693 mV was obtained in Example 2 and a voltage of 689 mV was obtained in Comparative Example 1. This proved that the configuration of the invention brought about an increase in electromotive force and therefore improved cell performance.

Accordingly, Test Examples 1 and 2 have proved that the fuel cell 100 having the fuel cell separator 11 of the invention is improved over the conventional fuel cell 100 in proton conductivity, electromotive force and performance.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function maybe varied substantially without departing from the spirit of the invention.

Industrial Applicability

The fuel cell separator and the fuel cell having the same according to the invention are useful in the technical field of fuel cells, because they can reduce variations in the supply amount of the reaction gases flowing in the reaction gas channels to obtain improved reaction gas utilization efficiency and, in consequence, perform efficient power generation.

The invention claimed is:

1. A plate-shaped fuel cell separator comprising:
a reaction gas supply manifold hole which is provided in a peripheral portion of the fuel cell separator to penetrate through the fuel cell separator in a thickness direction thereof;
a reaction gas discharge manifold hole which is provided in a peripheral portion of the fuel cell separator to penetrate through the fuel cell separator in a thickness direction thereof;
a groove-shaped first reaction gas channel which is formed in a spiral shape having a turn portion, in at least one principal surface of the fuel cell separator such that an upstream end thereof is connected to the reaction gas supply manifold hole, and a downstream end thereof is connected to the reaction gas discharge manifold hole; and
two or more groove-shaped second reaction gas channels which are formed in the at least one principal surface such that at least upstream ends thereof are connected to the reaction gas supply manifold hole, the second reaction gas channels being formed in a spiral shape while running along the first reaction gas channel;
the first reaction gas channel includes an upstream portion, a midstream portion and a downstream portion and is formed such that the midstream portion is surrounded by the upstream portion and the downstream portion, when viewed in a thickness direction of the separator;
wherein when a portion of the first reaction gas channel which is located in the downstream portion of the first reaction gas channel and is closest to the upstream end when viewed in the thickness direction of the separator is a first portion, the two or more second reaction gas channels are configured to run along each other such that the second reaction gas channels do not exist between the upstream end of the first reaction gas channel and the first portion of the first reaction gas channel, when viewed in the thickness direction of the separator;
wherein the first reaction gas channel is in communication, via only one communication channel, with a specific channel which is the two or more second reaction gas channels in a specific portion existing between the first portion and the downstream end, and configured to reduce a variation between a supply amount of supply gases flowing in the first reaction gas channel and the two or more second gas reaction channels, and
wherein the communication channel terminates at a downstream portion, closest to the upstream end, of the second reaction gas channel which is furthest from the first reaction gas channel.

2. The fuel cell separator as set forth in claim 1, wherein said specific channel is connected, at its downstream end, to said reaction gas supply manifold hole.

3. The fuel cell separator as set forth in claim 1, wherein said specific channel is in communication with said first reaction gas channel, with its downstream end being connected to said first reaction gas channel in said specific portion.

4. The fuel cell separator as set forth in claim 1, wherein a reaction gas mixing portion including a recess having a plurality of projections standing on a bottom surface thereof is formed in said specific portion, and wherein said first reaction gas channel and said specific channel join together in said reaction gas mixing portion to cause said first reaction gas channel to be in communication with said specific channel.

5. The fuel cell separator as set forth in claim 4, wherein said first reaction gas channel and said specific channel branch at said reaction gas mixing portion and extend toward said reaction gas discharge manifold hole.

6. The fuel cell separator as set forth in claim 1, wherein said reaction gas supply manifold hole and said reaction gas discharge manifold hole are arranged so as to sandwich a central portion of the fuel cell separator and to be opposed to each other.

7. A fuel cell comprising:
a pair of fuel cell separators including said fuel cell separator as set forth in claim 1; and
an electrolyte-layer/electrode assembly having an electrolyte layer and a pair of electrodes that sandwich said electrolyte layer,
wherein said electrolyte-layer/electrode assembly is sandwiched between said pair of fuel cell separators.

* * * * *